US012425527B2

(12) United States Patent
Kaneko et al.

(10) Patent No.: US 12,425,527 B2
(45) Date of Patent: Sep. 23, 2025

(54) INFORMATION PROCESSING SYSTEM, INFORMATION PROCESSING APPARATUS, INFORMATION PROCESSING METHOD, INFORMATION PROCESSING PROGRAM, IMAGING APPARATUS, METHOD OF CONTROLLING IMAGING APPARATUS, AND CONTROL PROGRAM FOR CONTROLLING BASED ON COLOR CONVERSION COEFFICIENT

(71) Applicant: Sony Group Corporation, Tokyo (JP)

(72) Inventors: Tetsuo Kaneko, Kanagawa (JP); Takashi Tsuchiya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 207 days.

(21) Appl. No.: 18/030,191

(22) PCT Filed: Jun. 29, 2021

(86) PCT No.: PCT/JP2021/024463
§ 371 (c)(1),
(2) Date: Apr. 4, 2023

(87) PCT Pub. No.: WO2022/102165
PCT Pub. Date: May 19, 2022

(65) Prior Publication Data
US 2023/0421715 A1  Dec. 28, 2023

(30) Foreign Application Priority Data

Nov. 13, 2020 (JP) ................. 2020-189642

(51) Int. Cl.
*H04N 1/60* (2006.01)
*G06V 10/56* (2022.01)
(Continued)

(52) U.S. Cl.
CPC .......... *H04N 1/6019* (2013.01); *G06V 10/56* (2022.01); *H04N 1/6033* (2013.01);
(Continued)

(58) Field of Classification Search
CPC .. H04N 1/6019; H04N 1/6033; H04N 1/6063; H04N 23/10; H04N 23/662;
(Continued)

(56) References Cited

U.S. PATENT DOCUMENTS 6,204,877 B1 * 3/2001 Kiyokawa ............ H04N 23/662
348/211.3
2009/0153745 A1 6/2009 Park
(Continued)

FOREIGN PATENT DOCUMENTS

JP 2011-004239 * 1/2011 ............. H04N 23/60
JP 2011-004239 A 1/2011
(Continued)

*Primary Examiner* — Hung H Lam
(74) *Attorney, Agent, or Firm* — Paratus Law Group, PLLC

(57) ABSTRACT

There are provided an information processing system, an information processing apparatus, an information processing method, an information processing program, an imaging apparatus, a method of controlling the imaging apparatus, and a control program capable of easily performing color matching in a plurality of imaging apparatuses. The information processing system includes: an imaging apparatus that operates in a master mode; at least one imaging apparatus that operates in a slave mode; and an information processing apparatus. Each of the imaging apparatus in the master mode and the imaging apparatus in the slave mode sends a chart image generated by capturing an image of a specific chart to the information processing apparatus, and the information processing apparatus calculates a color conversion coefficient in the imaging apparatus in the slave mode on the basis of the chart image generated by the
(Continued)

CHART imaging apparatus in the master mode, and sends the color conversion coefficient to the imaging apparatus corresponding to the color conversion coefficient.

20 Claims, 17 Drawing Sheets

(51) Int. Cl.
*H04N 23/10* (2023.01)
*H04N 23/661* (2023.01)
*H04N 23/83* (2023.01)
*H04N 23/85* (2023.01)

(52) U.S. Cl.
CPC ........... *H04N 1/6063* (2013.01); *H04N 23/10* (2023.01); *H04N 23/662* (2023.01); *H04N 23/83* (2023.01); *H04N 23/85* (2023.01)

(58) Field of Classification Search
CPC ...... H04N 23/83; H04N 23/85; H04N 23/667; H04N 23/90; H04N 17/002; G06V 10/56
See application file for complete search history.

(56) References Cited

U.S. PATENT DOCUMENTS

| | | | | |
|---|---|---|---|---|
| 2013/0250047 | A1* | 9/2013 | Hollinger | ............... H04N 23/50 |
| | | | | 348/36 |
| 2022/0327197 | A1* | 10/2022 | Rooyakkers | ........ H04L 63/0853 |

FOREIGN PATENT DOCUMENTS

| | | | | |
|---|---|---|---|---|
| JP | 2011-146936 | A | 7/2011 | |
| JP | 2018-152804 | * | 3/2017 | ............... H04N 1/60 |
| JP | 2018-152804 | A | 9/2018 | |
| JP | 2020113942 | A | 7/2020 | |
| JP | 2020177297 | A | 10/2020 | |

* cited by examiner

FIG. 2
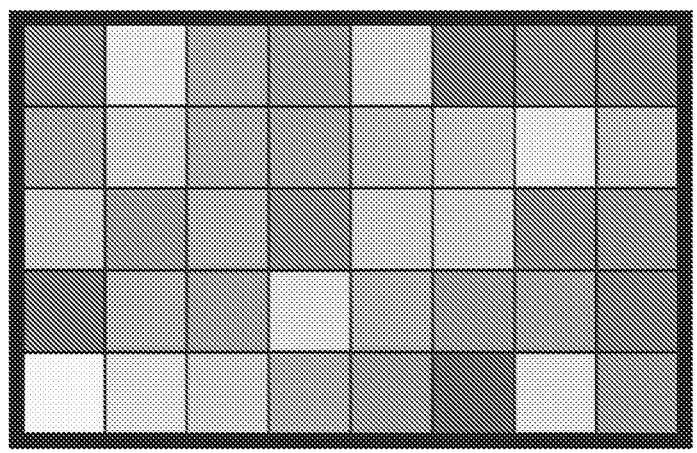
A (EXTENDED MACBETH 40 COLORS)
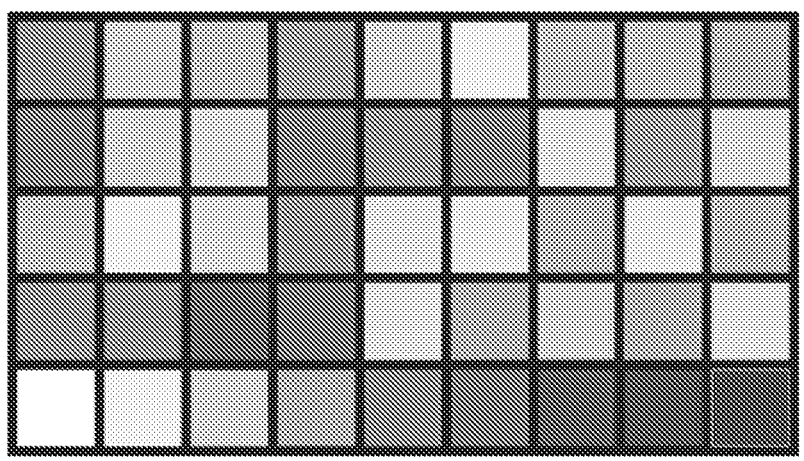
B (TE226 45 COLORS)
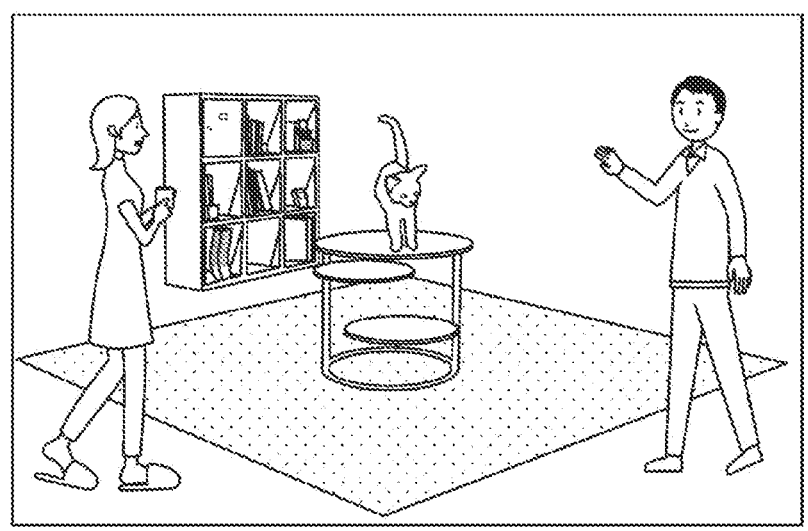
C (IMAGE)

FIG. 3
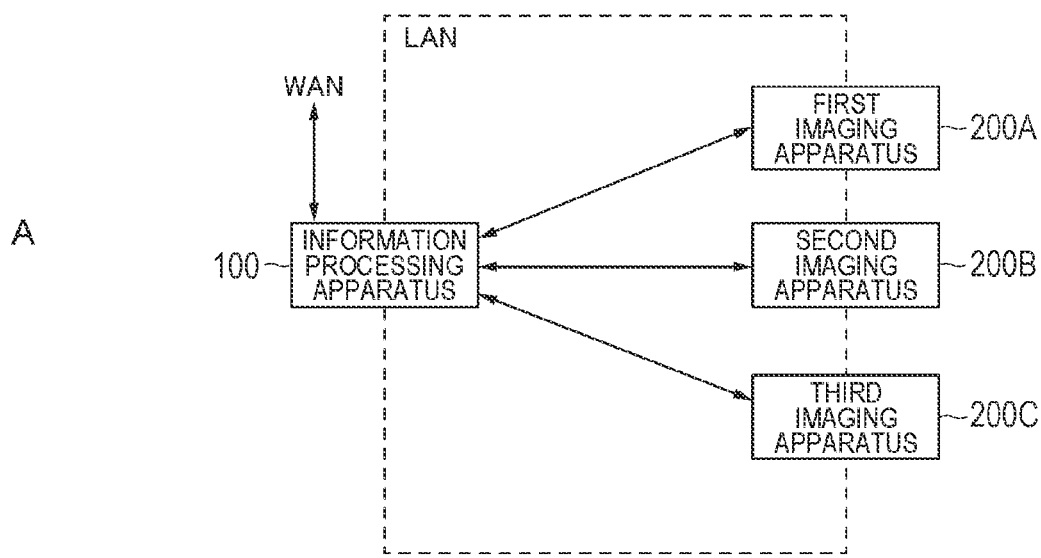
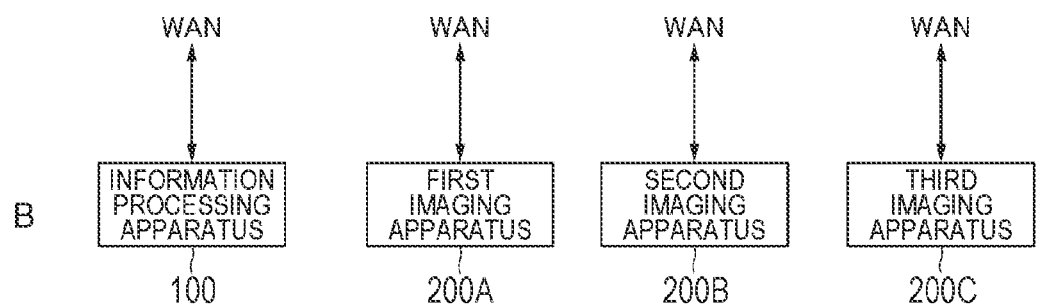

FIG. 11

$$\mathbf{x} = (x_1, x_2, \cdots, x_n)$$

$$\begin{bmatrix} g_1(\mathbf{x}_1) & g_1(\mathbf{x}_2) & \cdots & g_1(\mathbf{x}_l) \\ g_2(\mathbf{x}_1) & g_2(\mathbf{x}_2) & \cdots & g_2(\mathbf{x}_l) \\ \vdots & \vdots & \ddots & \vdots \\ g_m(\mathbf{x}_1) & g_m(\mathbf{x}_2) & \cdots & g_m(\mathbf{x}_l) \end{bmatrix} \begin{bmatrix} g_1(\mathbf{x}_1) & g_2(\mathbf{x}_1) & \cdots & g_m(\mathbf{x}_1) \\ g_1(\mathbf{x}_2) & g_2(\mathbf{x}_2) & \cdots & g_m(\mathbf{x}_2) \\ \vdots & \vdots & \ddots & \vdots \\ g_1(\mathbf{x}_l) & g_2(\mathbf{x}_l) & \cdots & g_m(\mathbf{x}_l) \end{bmatrix} \begin{bmatrix} a_1 \\ a_2 \\ \vdots \\ a_m \end{bmatrix}$$

$$= \begin{bmatrix} g_1(\mathbf{x}_1) & g_1(\mathbf{x}_2) & \cdots & g_1(\mathbf{x}_l) \\ g_2(\mathbf{x}_1) & g_2(\mathbf{x}_2) & \cdots & g_2(\mathbf{x}_l) \\ \vdots & \vdots & \ddots & \vdots \\ g_m(\mathbf{x}_1) & g_m(\mathbf{x}_2) & \cdots & g_m(\mathbf{x}_l) \end{bmatrix} \begin{bmatrix} y_1 \\ y_2 \\ \vdots \\ y_l \end{bmatrix}$$

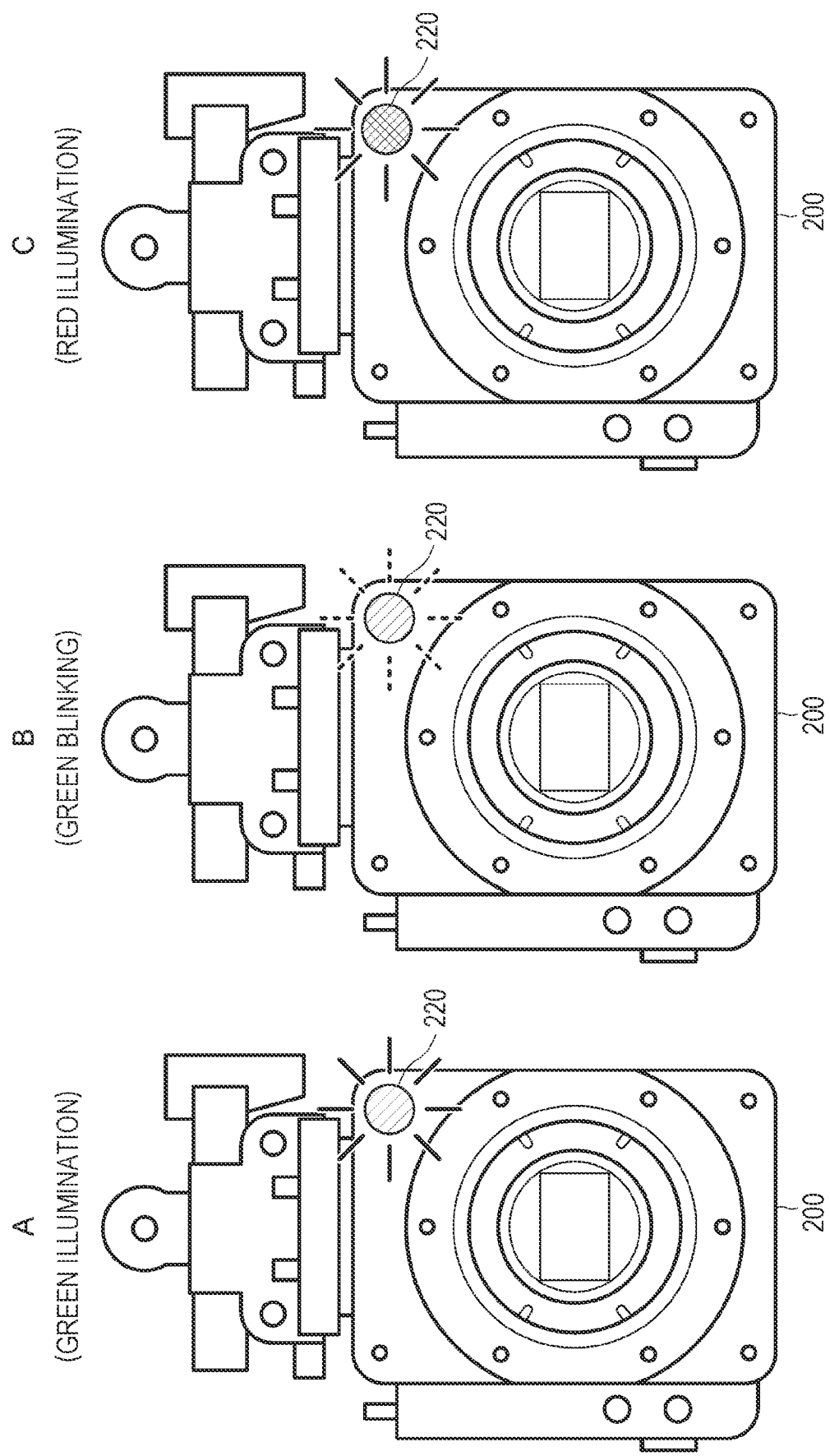

INFORMATION PROCESSING SYSTEM, INFORMATION PROCESSING APPARATUS, INFORMATION PROCESSING METHOD, INFORMATION PROCESSING PROGRAM, IMAGING APPARATUS, METHOD OF CONTROLLING IMAGING APPARATUS, AND CONTROL PROGRAM FOR CONTROLLING BASED ON COLOR CONVERSION COEFFICIENT

CROSS REFERENCE TO PRIOR APPLICATION

This application is a National Stage Patent Application of PCT International Patent Application No. PCT/JP2021/024463 (filed on Jun. 29, 2021) under 35 U.S.C. § 371, which claims priority to Japanese Patent Application No. 2020-189642 (filed on Nov. 13, 2020), which are all hereby incorporated by reference in their entirety.

TECHNICAL FIELD

The present technology relates to an information processing system, an information processing apparatus, an information processing method, an information processing program, an imaging apparatus, a method of controlling the imaging apparatus, and a control program.

BACKGROUND ART

A system (multi-camera system) that captures images with a plurality of cameras is widely used in recording of a television program in a studio, sports broadcasting, and the like. In the multi-camera system, it is possible to generate an image at a desired angle by switching a camera that captures an image in accordance with direction, movement of a subject, or the like.

In such a multi-camera system, it is necessary to perform color matching processing for each of all the cameras to unify the colors in the respective cameras in order to prevent an uncomfortable feeling from occurring when images captured by different cameras is viewed (Patent Document 1).

CITATION LIST

Patent Document

Patent Document 1: Japanese Patent Application Laid-Open No. 2011-146936

SUMMARY OF THE INVENTION

Problems to be Solved by the Invention

However, in the technology described in Patent Document 1, there is no specific content regarding a difference between colors in a camera that serves as a reference for color matching in a plurality of cameras and colors in another camera that is matched to the colors in the reference camera, and the colors cannot be accurately matched unless the difference is known.

The present technology has been made in view of such a point, and an object of the present technology is to provide an information processing system, an information processing apparatus, an information processing method, an information processing program, an imaging apparatus, a method of controlling the imaging apparatus, and a control program capable of easily performing color matching in a plurality of imaging apparatuses.

Solutions to Problems

In order to solve the above-described problem, a first technology is an information processing system including: an imaging apparatus that operates in a master mode; at least one imaging apparatus that operates in a slave mode; and an information processing apparatus, in which each of the imaging apparatus in the master mode and the imaging apparatus in the slave mode sends a chart image generated by capturing an image of a specific chart to the information processing apparatus, and the information processing apparatus calculates a color conversion coefficient in the imaging apparatus in the slave mode on the basis of the chart image generated by the imaging apparatus in the master mode, and sends the color conversion coefficient to the imaging apparatus corresponding to the color conversion coefficient.

Furthermore, a second technology is an information processing apparatus including a color conversion coefficient calculating unit that calculates a color conversion coefficient in an external imaging apparatus that operates in the slave mode on the basis of a chart image generated by capturing an image of a specific chart by an external imaging apparatus that operates in the master mode.

Furthermore, a third technology is an information processing method including calculating a color conversion coefficient in an external imaging apparatus that operates in a slave mode on the basis of a chart image generated by capturing an image of a specific chart by an external imaging apparatus that operates in a master mode.

Furthermore, a fourth technology is an information processing program causing a computer to execute an information processing method including calculating a color conversion coefficient in an external imaging apparatus that operates in a slave mode on the basis of a chart image generated by capturing an image of a specific chart by an external imaging apparatus that operates in a master mode.

Furthermore, a fifth technology is an imaging apparatus that operates in a master mode or a slave mode, sends a chart image generated by capturing an image of a specific chart to an information processing apparatus, and in a case of operating in the slave mode, receives a color conversion coefficient calculated by the information processing apparatus from the information processing apparatus and sets the color conversion coefficient for color gamut conversion.

Furthermore, a sixth technology is a method of controlling an imaging apparatus that operates in a master mode or a slave mode, sends a chart image generated by capturing an image of a specific chart to an information processing apparatus, and in a case of operating in the slave mode, receives a color conversion coefficient calculated by the information processing apparatus from the information processing apparatus and sets the color conversion coefficient for color gamut conversion.

Moreover, a seventh technology is a control program causing a computer to execute a method of controlling an imaging apparatus that operates in a master mode or a slave mode, sends a chart image generated by capturing an image of a specific chart to an information processing apparatus, and in a case of operating in the slave mode, receives a color conversion coefficient calculated by the information processing apparatus from the information processing apparatus and sets the color conversion coefficient for color gamut conversion.

BRIEF DESCRIPTION OF DRAWINGS

FIG. 2 is a diagram illustrating configurations of a chart.

FIG. 3 is a diagram illustrating examples of network connection of the information processing system 10.

FIG. 11 is a calculation formula of a multivariable least squares method.

FIG. 17 is a view illustrating state presentation by illumination of a light in the imaging apparatus 200.

MODE FOR CARRYING OUT THE INVENTION

Hereinafter, embodiments of the present technology will be described with reference to the drawings. Note that the description will be given in the following order.
<1. Embodiments>
[1-1. Configuration of information processing system 10]
[1-2. Configuration of information processing apparatus 100]
[1-3. Configuration of imaging apparatus 200]
[1-4. Processing in information processing system 10]
[1-5. User interface]
<2. Modifications>

1. Embodiments

[1-1. Configuration of Information Processing System 10]

Figure 1:
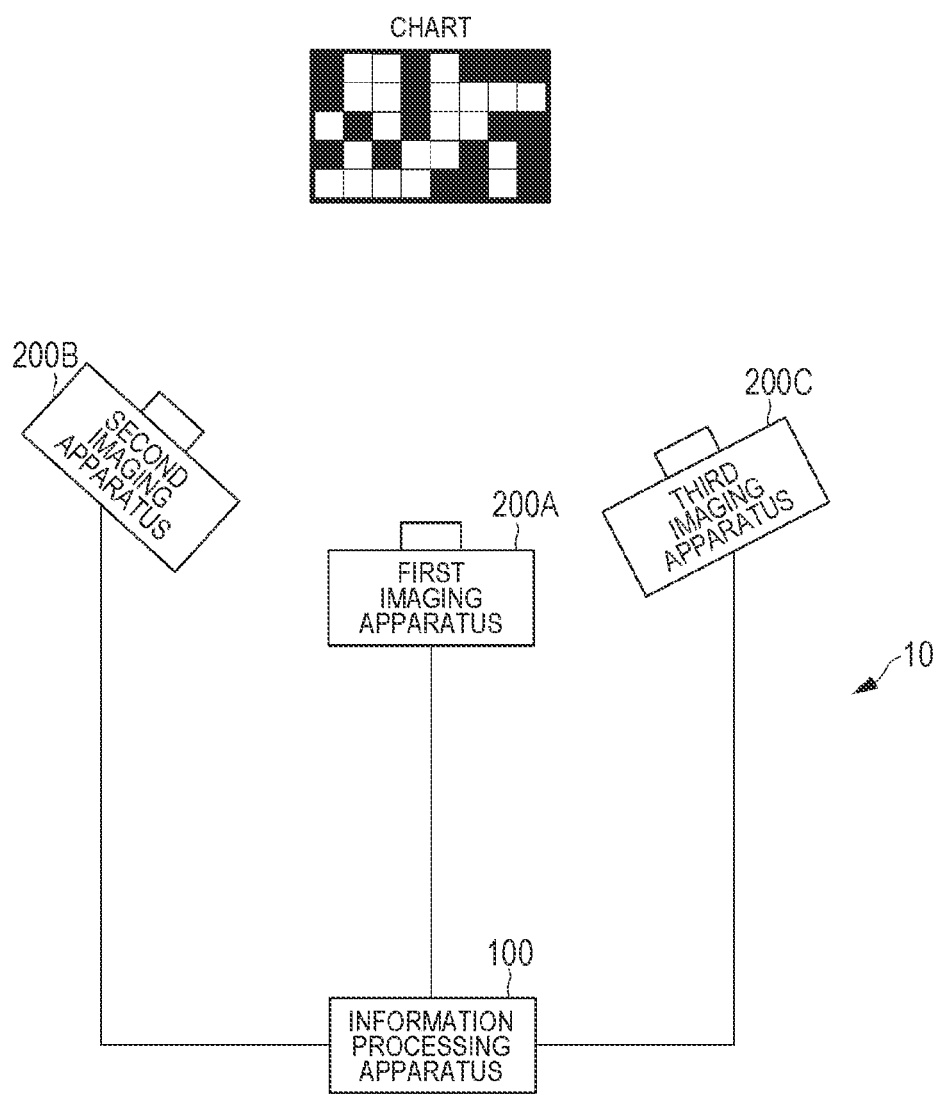
FIG. 1 is a block diagram illustrating a configuration of an information processing system 10.

A configuration of an information processing system 10 according to the present technology will be described with reference to FIG. 1. The information processing system 10 includes an information processing apparatus 100, a first imaging apparatus 200A, a second imaging apparatus 200B, and a third imaging apparatus 200C. Note that, although three imaging apparatuses 200 are illustrated, the number of imaging apparatuses 200 is not limited and may be any as long as it is two or more. In the following description, in a case where it is not necessary to distinguish the first imaging apparatus 200A, the second imaging apparatus 200B, and the third imaging apparatus 200C, they are referred to as imaging apparatuses 200.

The information processing apparatus 100 is configured as an apparatus such as a personal computer, a smartphone, or a tablet terminal, and the information processing apparatus 100 and the imaging apparatus 200 are connected via a network or the like.

The information processing apparatus 100, for example, calculates a color conversion coefficient for performing calibration for matching colors in all the imaging apparatuses 200.

The imaging apparatus 200 is for a user to capture an image in recording of a television program, sports broadcasting, production of a movie or a drama, and the like. In the present embodiment, the imaging apparatus 200 operates in a master mode or a slave mode. The master mode is an operation mode of the imaging apparatus 200 serving as a reference for calculating a color conversion coefficient by the information processing apparatus 100, and the slave mode is an operation mode of all the imaging apparatuses 200 other than the imaging apparatus 200 operating in the master mode. The information processing apparatus 100 calculates a color conversion coefficient for the imaging apparatus 200 operating in the slave mode so as to match colors in the imaging apparatus 200 operating in the slave mode to colors in the imaging apparatus 200 operating in the master mode. In the following description, the imaging apparatus operating in the master mode is referred to as a master imaging apparatus, and the imaging apparatus operating in the slave mode is referred to as a slave imaging apparatus in some cases.

The information processing apparatus 100 calculates a color conversion coefficient by using an image (hereinafter referred to as a chart image) generated by capturing an image of a chart with the imaging apparatus 200. Examples of the chart include Macbeth charts including patches of a plurality of colors as illustrated in FIGS. 2A and 2B. Colors of the chart may be any as long as the shape of the chart is rectangular and the shape of the patch of each color constituting the chart is also rectangular. The greater the number of colors included in the chart is, the more preferable it is because optimum color matching can be performed for various colors. In the present embodiment, the Macbeth chart illustrated in FIG. 2A is used as the chart. Note that the chart may be an image obtained by capturing an image of a subject such as a person or a landscape as illustrated in FIG. 2C. In a case where color matching is performed for capturing an image of a person, a captured image in which a person is a subject is preferably used as a chart. It can be said that the Macbeth chart is a chart consisting of patches, and the image chart is a chart consisting of pixels. Color matching is to match the color gamuts of imaging apparatuses 200 except one imaging apparatus 200 serving as a reference among the plurality of imaging apparatuses 200 to the color gamut of the one imaging apparatus 200 and to make colors of captured images the same or a difference in color equal to or less than a predetermined value.

Each of the master imaging apparatus 200 and the slave imaging apparatus 200 captures an image of a specific chart and generate a chart image. The specific chart for the master imaging apparatus 200 and the specific chart for the slave imaging apparatus 200 may be the same chart as an object or different charts as objects. In a case where they are different as objects, one specific chart should include same colors, number and arrangement of patches as those of the other specific chart. Therefore, there is a case where the master imaging apparatus 200 and the slave imaging apparatus 200 exist in the same space and capture images of the same chart, or there is a case where the master imaging apparatus 200 and the slave imaging apparatus 200 exist in spaces away from each other and capture images of different charts as objects.

FIG. 3 illustrates connection examples of the apparatuses at an image-capturing site. Basically, all the apparatuses need to be connected to a network in order to be connected to the information processing apparatus 100. Here, two representative examples are illustrated.

As illustrated in FIG. 3A, a first example is an example in which each apparatus is a constituent of a local area network (LAN), and external Internet connection (wide area network (WAN)) is made by using only one apparatus (the information processing apparatus 100 in FIG. 3A) as an access point. Although the information processing apparatus 100 serves the access point in FIG. 3A, any apparatus may serve as the access point. LAN connection between the apparatuses on site has an advantage that communication between the apparatuses can be performed at a high speed and a wide band. Furthermore, the apparatuses other than the apparatus serving as the access point is only required to have, for example, a WiFi function, and it is not necessary for each apparatus to individually contract with a WAN communication provider.

A second example is a configuration example in which each of all the apparatuses is directly connected to an external network (WAN) as illustrated in FIG. 3B (WAN configuration example). A characteristic thereof is that a connection configuration is simple; however, each apparatus needs to contract with a WAN communicator so as to be able to communicate.

[1-2. Configuration of Information Processing Apparatus 100]

Figure 4:
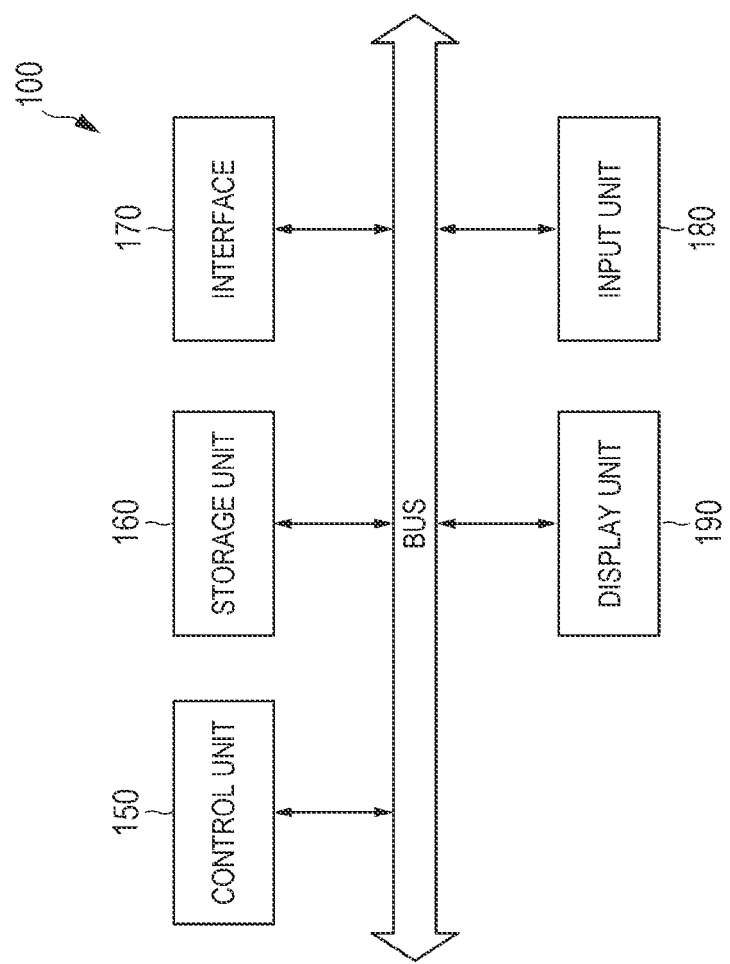
FIG. 4 is a block diagram illustrating a configuration of an information processing apparatus 100.

Next, a configuration of the information processing apparatus 100 will be described with reference to FIG. 4. The information processing apparatus 100 includes a control unit 150, a storage unit 160, an interface 170, an input unit 180, and a display unit 190.

The control unit 150 includes a central processing unit (CPU), a random access memory (RAM), a read only memory (ROM), and the like. The CPU executes various processes according to a program stored in the ROM and issues commands, thereby controlling entirety and each unit of the information processing apparatus 100.

The storage unit 160 is, for example, a mass storage medium such as a hard disk or a flash memory.

The interface 170 is an interface with the imaging apparatus 200, another apparatus, the Internet, and the like. The interface 170 can include a wired or wireless communication interface. Furthermore, more specifically, the wired or wireless communication interface can include cellular communication such as 3TTE, Wi-Fi, Bluetooth (registered trademark), near field communication (NFC), Ethernet (registered trademark), serial digital interface (SDI), high-definition multimedia interface (HDMI) (registered trademark), universal serial bus (USB), and the like. In addition, in a case where the imaging apparatus 200 and the information processing apparatus 100 are physically connected, the interface 170 can include a connection terminal between the apparatuses, a bus in the apparatus, and the like (hereinafter, these are also referred to as interfaces in the apparatus). Furthermore, in a case where the imaging apparatus 200 and the information processing apparatus 100 are implemented in a distributed manner in a plurality of apparatuses, the interface 170 may include different kinds of interfaces for the respective apparatuses. For example, the interface 170 may include both a communication interface and an interface in the apparatus.

The input unit 180 is used by a user to input various instructions to the information processing apparatus 100. If an input is made to the input unit 180 by the user, a control signal corresponding to the input is generated and supplied to the control unit 150. Then, the control unit 150 performs various processes corresponding to the control signal. Examples of the input unit 180 include a touch panel, a physical button, a touch screen integrally formed with the display unit 305, and the like.

The display unit 190 is a display device including, for example, a liquid crystal display (LCD), a plasma display panel (PDP), an organic electro luminescence (EL) panel, or the like. A user interface and the like for using the information processing system 10 are displayed on the display unit 190.

Figure 5:
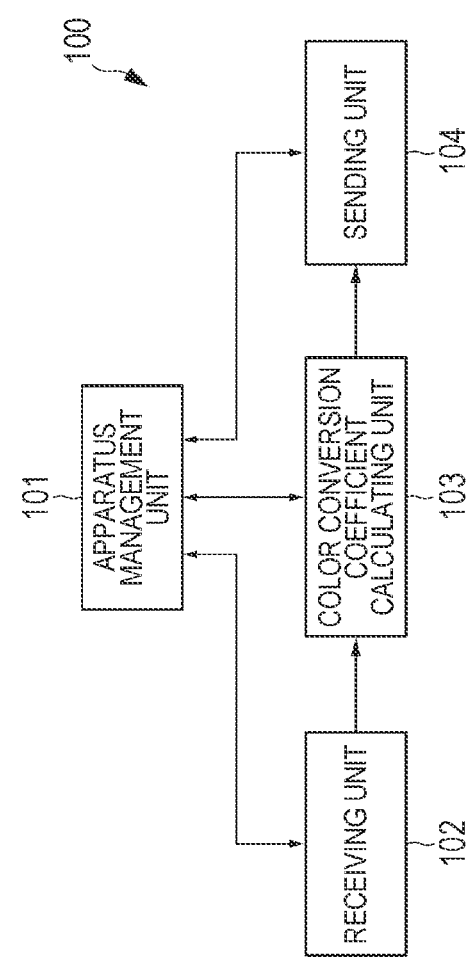
FIG. 5 is a block diagram illustrating a configuration of functional blocks of the information processing apparatus 100.

Furthermore, as illustrated in FIG. 5, the information processing apparatus 100 includes functional blocks such as an apparatus management unit 101, a receiving unit 102, a color conversion coefficient calculating unit 103, and a sending unit 104. The apparatus management unit 101 and the color conversion coefficient calculating unit 103 are functions realized by the control unit 150. Furthermore, sending and receiving of data and information with the imaging apparatus 200 in the receiving unit 102 and the sending unit 104 are performed by using the interface 170.

The apparatus management unit 101 performs registration addition/registration deletion of the imaging apparatus 200 constituting the information processing system 10, setting of the imaging apparatus 200 to be operated in the master mode/slave mode, setting of on/off of automatic calibration, and the like.

The receiving unit 102 performs processing of receiving a chart image sent from the imaging apparatus 200 via the interface 170. The received chart image is supplied to the color conversion coefficient calculating unit 103.

The color conversion coefficient calculating unit 103 calculates a color conversion coefficient on the basis of a plurality of chart images received from the plurality of imaging apparatuses 200. The color conversion coefficient calculating unit 103 calculates a color conversion coefficient for each slave imaging apparatus 200. Therefore, the color conversion coefficient is different for each slave imaging apparatus 200. In a case where the color gamut conversion unit 204 in the imaging apparatus 200 includes a matrix circuit, the color conversion coefficient needs to be calculated as a matrix coefficient. Furthermore, in a case where the color conversion coefficient includes a 3D LUT circuit, the color conversion coefficient needs to be calculated as a 3D LUT. Details of color conversion coefficient calculation will be described later.

The sending unit 104 performs processing of sending the color conversion coefficient calculated by the color conversion coefficient calculating unit 103 to the slave imaging apparatus 200 via the interface 170.

The information processing apparatus 100 is configured as described above. Note that the processing in the information processing apparatus 100 may be realized by executing a program, and a personal computer, a tablet terminal, a smartphone, server equipment, or the like may have a function as the information processing apparatus 100 by executing the program. The program may be installed in the information processing apparatus 100 in advance, or may be distributed by download, in a storage medium, or the like and installed by the user himself/herself.

[1-3. Configuration of Imaging Apparatus 200]

Figure 6:
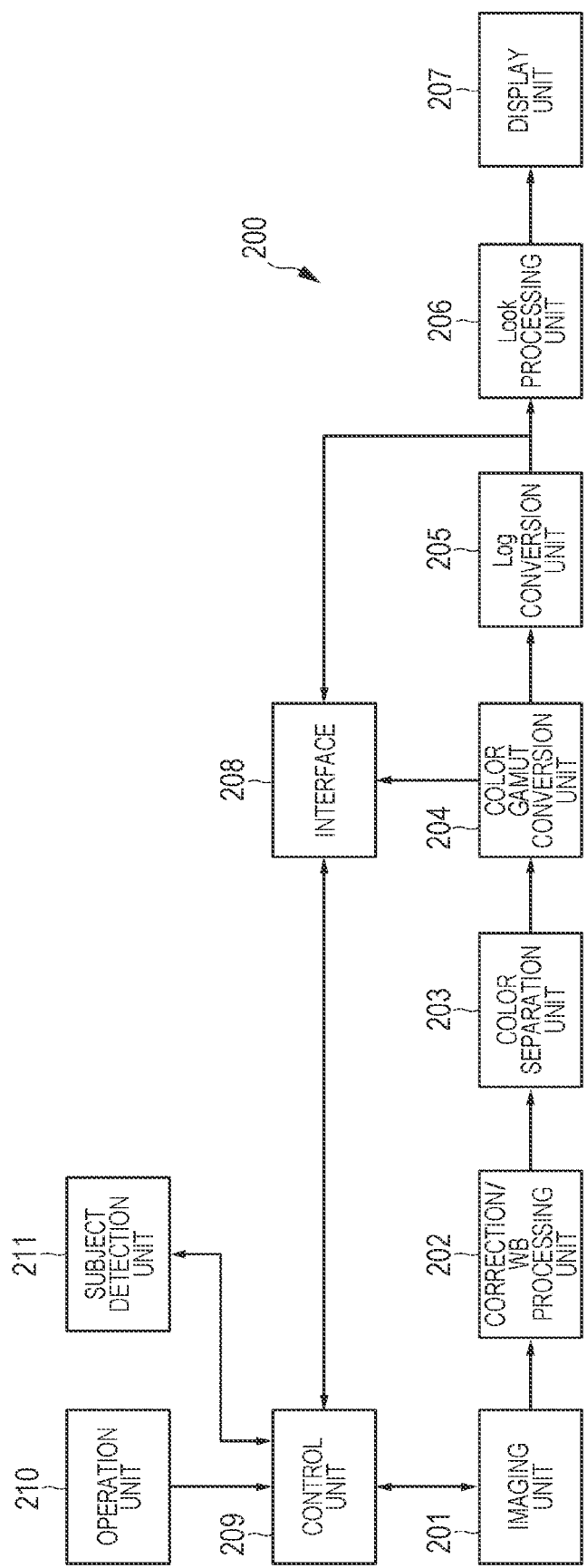
FIG. 6 is a block diagram illustrating a configuration of an imaging apparatus 200.

A configuration of the imaging apparatus 200 will be described with reference to FIG. 6. The imaging apparatus 200 includes an imaging unit 201, a correction/white balance processing unit 202, a color separation unit 203, a color gamut conversion unit 204, a log conversion unit 205, a look processing unit 206, a display unit 207, an interface 208, a control unit 209, an operation unit 210, and a subject detection unit 211.

The imaging unit 201 includes a lens, an imaging element that photoelectrically converts incident light from a subject obtained through the lens into a charge amount and outputs an imaging signal, a lens drive driver that drives the lens, a processing unit that generates image data by performing analog/digital (A/D) conversion or the like on the imaging signal, and the like. Examples of the imaging element include a charge coupled device (CCD), a complementary metal oxide semiconductor (CMOS), and the like.

Note that the imaging element may be a single-chip Bayer array imaging element, may be a three-chip imaging element, or may be a single-chip non-Bayer array imaging element, and the processing after an RGB image is generated is common in all the cases.

The correction/white balance processing unit 202 performs optical correction processing and white balance processing on image data.

The color separation unit 203 performs, for example, demosaic processing as color separation processing on the image data subjected to the white balance processing. Note that the color separation unit 203 is not an essential configuration, and is unnecessary if the imaging element does not have a Bayer array.

The color gamut conversion unit 204 performs a process of converting the color gamut of RGB image data by using a color conversion coefficient calculated by the information processing apparatus 100, a color conversion coefficient included in the color gamut conversion unit 204 in advance, or the like.

A color gamut is a definition of how colors are represented. Each of RGB values of a same color differs in different color gamuts. There are various kinds of color gamuts, such as BT.709 in a standard dynamic range (SDR), BT.2020 in a high dynamic range (HDR), DCI-P3 in a cinema projector, and S-Gamut3 in a log format of a specific manufacturer. Furthermore, also the imaging element has a unique color gamut (sensor color gamut) due to color filter characteristics. For example, in a case where the color gamut of one imaging apparatus 200 is A and the color gamut of the other imaging apparatus 200 is B, if both the color gamuts A and B are converted into a different color gamut C, colors are matched. Furthermore, the color gamut of the imaging apparatus 200 having the color gamut A may be matched to the color gamut B. However, even if the color gamut of one imaging apparatus 200 and the color gamut of the other imaging apparatus 200 are converted to the same color gamut, colors are not completely matched due to a difference in spectral characteristics of the imaging apparatuses or the like in some cases. Ideally, if the color gamuts are converted into the same color gamut and a certain color on the color gamut is expressed, the RGB value thereof is the same in one imaging apparatus 200 and the other imaging apparatus 200. However, in some cases, colors are perfectly matched in practice (the difference between the RGB signal values is 0), and in other cases, colors are not matched but deviated depending on the color. In the present technology, such a problem can be solved and colors can be matched.

In a case where the imaging apparatus 200 is in the master mode, the color gamut conversion unit 204 performs standardization processing of converting the color gamut of the imaging element into a standard color gamut (Rec.709, S-Gamut3.cine, or the like). In contrast, in a case where the imaging apparatus 200 is in the slave mode, the color gamut conversion unit 204 performs standardization processing of converting the color gamut of the imaging element into the standard color gamut, sets a color conversion coefficient calculated by the information processing apparatus 100 for color gamut conversion, and performs color gamut conversion by using the color conversion coefficient. As a result, color matching in the standard color gamut is performed between the imaging apparatuses 200 before look processing by the look processing unit 206. Standardization means that specifications are unified to standard specifications (can also be said as commonized) so that color processing can be appropriately performed between different apparatuses (including not only an imaging apparatus but also a monitor as a display apparatus, editing software, and the like) that handle images and videos.

In a case where the color gamut conversion unit 204 includes a matrix circuit, a color conversion coefficient needs to be calculated as a matrix coefficient. Furthermore, in a case where the color conversion coefficient includes a 3D LUT circuit, the color conversion coefficient needs to be calculated as a 3D LUT.

The log conversion unit 205 converts linear image data from the color gamut of the imaging element into a standard format (such as S-Log3) in a log format after the color gamut is converted by the color gamut conversion unit 204. The converted image data may be output to the outside through a serial digital interface (SDI) or the like.

Note that the recording format of image data of the imaging apparatus 200 itself may be not only encoded log material but also scene-referred RAW material.

Note that it is also possible to perform look processing on linear image data instead of image data in a log format and output linear image data. Furthermore, even in the case of linear image data, gamma (=logarithm (log characteristic)) is applied to the transmission signal thereof in some case. For example, there may be a case where gamma is applied to linear image data for transmission and the linear image data is transmitted, and then inverse gamma is applied to the image data by a display apparatus (for band compression on a transmission path, or the like). The log for transmission used to apply gamma is a log (gamma) different from the log described above.

The look processing unit 206 performs look processing on the image data after the color gamut conversion by the color gamut conversion unit 204. The Look processing unit 206 is implemented by, for example, a 3D LUT circuit, a 1D LUT circuit, a combination of a 1D LUT circuit and a matrix, or the like. Look is a way of expressing colors and gradations, and can also be said to be a visual style containing intention of a person who creates an image/video work. When a work such as a movie is produced, it is common to unify and make the look consistent within the work. Furthermore, it is also necessary to optimize the look for each display device for viewing the work. This is because, even though brightness and color width (color gamut) that can be expressed are different for each display device, the same look is realized within the range that can be expressed.

The look processing unit 206 performs look processing on image data on the basis of look data acquired from a look data providing system configured as a cloud system or preset look data incorporated in the main body of the imaging apparatus 200. The look processing unit 206 may have a CDL adjustment function or the like.

The look data providing system is a system that provides look data to a user, manages an account of the user who uses look data and information of the user, registers and manages an electronic device or the like used by the user, and manages device information specific to the user, preference information of look data, and the like. A business operator who provides look data by the look data providing system can provide a comprehensive look management service including provision of look data to a user.

Furthermore, in the look data providing system, access management is performed by associating look data with a license, and thus, it is possible to construct a license contract with a user and a billing mechanism for collecting a fee from a user. In addition, for example, it is also possible to construct a business model in which a person who used look data (a photographer, a creator who performs post-production, or the like) pays for the look data, a company (a production company or the like) that created the look data receives the usage fee, and an external cloud system operating company receives part of the usage fee. Moreover, it is also possible to set a plurality of billing plans according to the number, kinds, and the like of pieces of look data, and construct a service in which look data that can be used by a user is different for each billing plan selected by the user.

Look component data included in look data is data in a 3D LUT format (.cube file, or the like) or a 1D LUT format applied to log material (captured in a format such as S-Log3 or S-Gamut3). 1D LUT is common to RGB. In 3D LUT, different 1D LUTs are applied to RGB, respectively. Log material has a format in which an optical signal of a subject is faithfully recorded, and in order to match the gradations and color gamuts between imaging apparatuses, specifications thereof are commonized in general. Look component data is applied to the log material. By using 3D LUT data applied to the standardized log material, the same look can be reproduced by applying the same look data to image data captured in the format of the log material even if any imaging apparatuses 200 whose manufacturer, model, version, and the like are different are used.

The look processing is performed by the look processing unit 206 after color gamut conversion, and since color matching is performed by color gamut conversion using the color conversion coefficient in the master imaging apparatus 200 and the slave imaging apparatus 200, the same result can be obtained by setting the same look to the look processing units 206 of the master imaging apparatus 200 and the slave imaging apparatus 200.

The display unit 207 displays image data which has been subjected to look processing by the look processing unit 206, a through-the-lens image, stored image/video data, a graphical user interface (GUI), and the like. Examples of the display unit 207 include an electronic view finder (EVF) and a display. For example, the display unit 207 includes an LCD, a PDP, an organic EL panel, or the like. The imaging apparatus 200 also has a function of displaying unique identification information (for example, a QR code (registered trademark)) for identifying the apparatus on the display unit 207. The identification information is used to register the imaging apparatus 200 to the information processing apparatus 100 as an apparatus constituting the information processing system 10 and to connect the imaging apparatus 200 to the information processing apparatus 100.

The identification information may include manufacturer information, device model information, device version information, device type number information, an IP address used by the apparatus, classification information of the display device included in the apparatus, and the like.

The manufacturer information is information such as the name of a manufacturer that identifies the manufacturer which manufactures or sells the imaging apparatus 200. The device model information is information indicating the kind and the like of the imaging apparatus 200. The device version information is information indicating the version of the imaging apparatus 200 in a case where a plurality of versions exists in the same model of the imaging apparatus 200. It is common to sell a product of an edition different from the previous edition by removing a defect or adding a new function after the product is sold. The version indicates such a difference depending on the time series. The device type number information is a type number attached to each type to identify the type of the imaging apparatus 200. The IP address is a number for identifying the imaging apparatus 200 on an IP network. The classification information of the display device is information indicating the classification (display method or the like) of the display unit 207 included in the imaging apparatus 200.

The display unit 207 displays an image on the basis of a predetermined display method. Examples of the display method include Rec.709 and hybrid log gamma (HLG). These display methods define various requirements such as a resolution, a frame rate, a color gamut, and an assumed luminance of the display device. HLG means a hybrid of Rec.709 and log. Some of the display units 207 of the imaging apparatuses 200 are displayed in Rec.709, and others are displayed in HLG depending on the manufacturer, product model, version, and the like of the imaging apparatus 200.

The interface 208 is an interface with the information processing apparatus 100, a network, and the like, and is similar to that included in the information processing apparatus 100. The imaging apparatus 200 is connected to the information processing apparatus 100 via the interface 208 and the network, and can send a chart image to the information processing apparatus 100 and moreover, can receive the color conversion coefficient sent from the information processing apparatus 100.

The control unit 209 includes a CPU, a RAM, a ROM, and the like. The CPU executes various processes according to a program stored in the ROM and issues commands, thereby controlling entirety and each unit of the imaging apparatus 200.

The operation unit 210 is a release button, a touch panel, or the like operated by the user to give an image-capturing instruction.

The subject detection unit 211 performs processing of detecting a chart by using a known subject detection function. The chart detection result is supplied to the control unit 209, and the imaging unit 201 captures an image of the chart and generates a chart image under the control of the control unit 209.

As will be described in detail later, the control unit 209 causes the imaging apparatus 200 to be in a state in which an image-capturing operation on the operation unit 210 from the user is disabled in response to an image-capturing operation disable instruction from the information processing apparatus 100. Furthermore, the control unit 209 performs control to switch the imaging apparatus 200 from the image-capturing operation disabled state to an image-capturing operation enabled state in response to an image-capturing operation enable instruction from the information processing apparatus 100. Moreover, the control unit 209 also performs on/off control of automatic calibration.

Furthermore, although not illustrated, the imaging apparatus 200 also includes, for example, a storage unit that stores image data, look data, and the like.

The imaging apparatus 200 is configured as described above. The imaging apparatus 200 may be an apparatus specialized in a camera function such as a digital camera, a single-lens reflex camera, a camcorder, a business camera, or a specialist image-capturing device. In addition, the imaging apparatus 200 may also be a smartphone, a tablet terminal, a wearable device, or the like having a camera function. Note that the processing in the imaging apparatus 200 may be realized by executing a program. The program may be installed in the imaging apparatus 200 in advance, or may be distributed by download, in a storage medium, or the like and installed by the user himself/herself.

[1-4. Processing in Information Processing System 10]

Processing in the information processing system 10 will be described with reference to FIGS. 7 and 8. Note that, in FIGS. 7 and 8, for convenience of explanation, it is illustrated that the processing is performed in order of the first imaging apparatus 200A, the second imaging apparatus 200B, and the third imaging apparatus 200C. However, the processing of the first imaging apparatus 200A is not necessarily performed first. The processing in the second imaging apparatus 200B or the third imaging apparatus 200C is performed first in some cases, and the processing in all the imaging apparatuses 200 is performed substantially simultaneously in other cases. The order in which the imaging apparatus 200 performs the processing is not limited to any order.

First, in step S101, the apparatus management unit 101 of the information processing apparatus 100 sets any of the plurality of imaging apparatuses 200 that has been registered as the imaging apparatus 200 operating in the master mode, and sets the other imaging apparatuses as the imaging apparatuses 200 operating in the slave mode.

The apparatus management unit 101 can set any one of the plurality of imaging apparatuses 200 that has been registered as the imaging apparatus 200 operating in the master mode by various methods.

The apparatus management unit 101 can set the imaging apparatus 200 operating in the master mode on the basis of the positions of the plurality of imaging apparatuses 200. For example, the imaging apparatus 200 positioned substantially in front of the subject whose image is captured after color matching is set to the master mode. As described, in a case where the imaging apparatus 200 operating in the master mode is set on the basis of the positions of the imaging apparatuses 200, the information processing apparatus 100 needs to acquire information of the positional relationships between the imaging apparatuses 200 under the control thereof and the subject in advance.

Furthermore, the apparatus management unit 101 can set the imaging apparatus 200 operating in the master mode on the basis of the performance of the imaging apparatuses 200. For example, the imaging apparatus 200 compatible with SDR is set to the master mode on the basis of whether the imaging apparatus 200 is compatible with HDR or SDR. This is because HDR enables display in wider luminance and contrast ranges than those in SDR, and thus the SDR imaging apparatus 200 cannot reproduce the HDR color gamut, and it is difficult to match colors in the SDR imaging apparatus 200 to those in the HDR imaging apparatus 200. In a case where the imaging apparatus 200 to be set to the master mode is determined on the basis of the performance of the imaging apparatuses 200 in this manner, the information processing apparatus 100 needs to acquire performance information of the imaging apparatuses 200 from the imaging apparatuses 200 in advance.

Furthermore, since any imaging apparatus 200 may be set to the master mode as long as it is desired to match the colors in all the imaging apparatuses 200 instead of matching colors in the imaging apparatuses 200 other than a specific imaging apparatus 200 among the plurality of imaging apparatuses 200 to colors in the specific imaging apparatus 200, the apparatus management unit 101 may randomly determine the imaging apparatus 200 to be set to the master mode from among the plurality of imaging apparatuses 200.

Furthermore, the apparatus management unit 101 may determine the imaging apparatus 200 to be set to the master mode on the basis of an input from the user.

Figure 7:
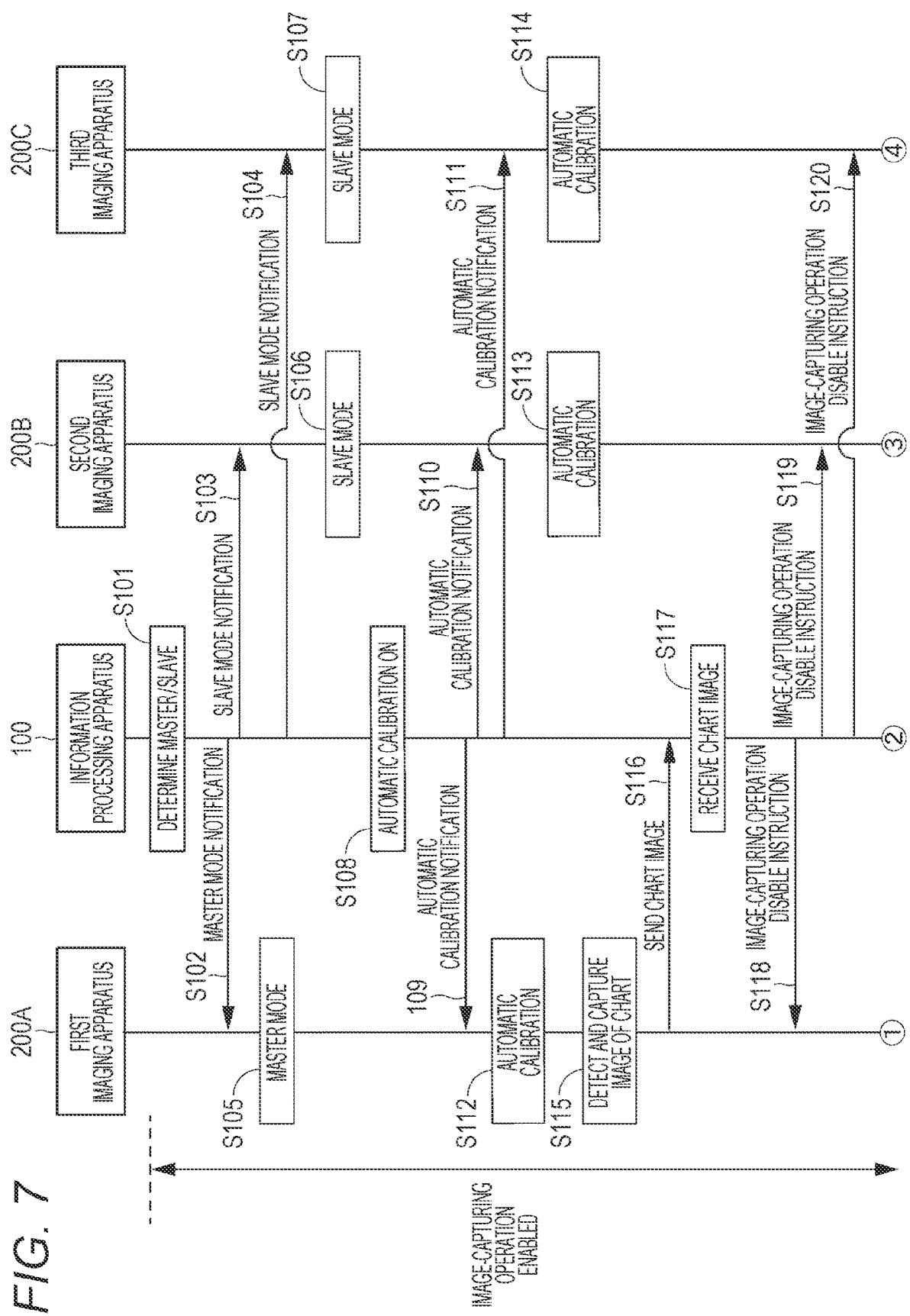
FIG. 7 is a sequence diagram illustrating processing in the information processing system 10.
Figure 8:
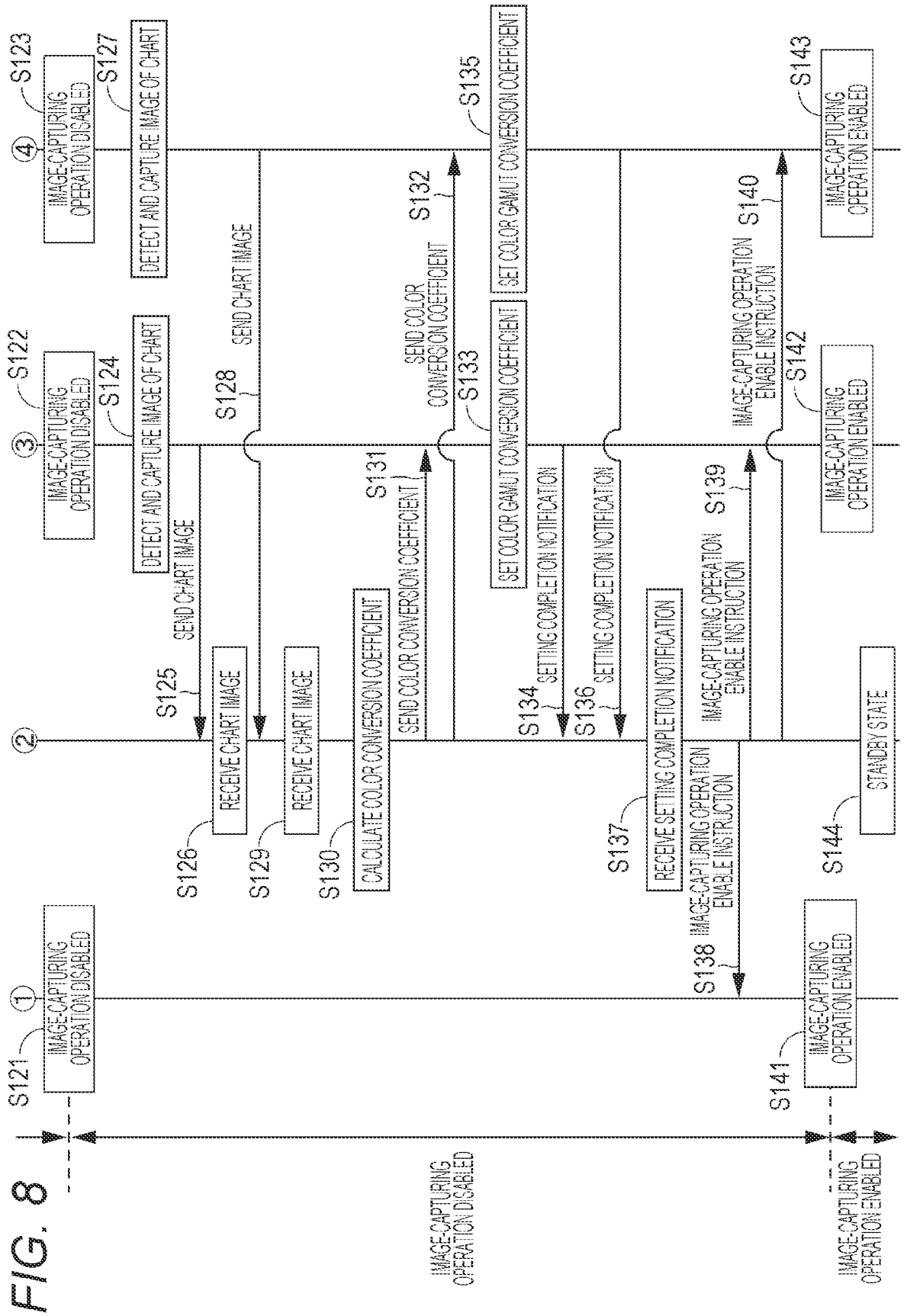
FIG. 8 is a sequence diagram illustrating the processing in the information processing system 10.

In the example of FIGS. 7 and 8, description will be given assuming that the first imaging apparatus 200A is set to the master mode, and the second imaging apparatus 200B and the third imaging apparatus 200C are set to the slave mode.

As described in step S102, the information processing apparatus 100 sends a notification to operate in the master mode to the first imaging apparatus 200A determined to be in the master mode. Furthermore, as described in step S103, the information processing apparatus 100 sends a notification to operate in the slave mode to the second imaging apparatus 200B determined to be in the slave mode. Furthermore, as described in step S104, a notification to operate in the slave mode is sent to the third imaging apparatus 200C determined to be in the slave mode. Then, in step S105, the first imaging apparatus 200A starts operation in the master mode. In step S106, the second imaging apparatus 200B starts operation in the slave mode. In step S107, the third imaging apparatus 200C starts operation in the slave mode. Note that the first imaging apparatus 200A in the master mode needs to send a notification to the information processing apparatus 100 in order to notify the information processing apparatus 100 that the first imaging apparatus 200A itself operates in the master mode.

Next, as described in step S108, the information processing apparatus 100 turns automatic calibration on. Then, in steps S109, S110, and S111, the information processing apparatus 100 sends a notification to turn on the automatic calibration to the first imaging apparatus 200A, the second imaging apparatus 200B, and the third imaging apparatus 200C, respectively.

Then, in steps S112, S113, and S114, the first imaging apparatus 200A, the second imaging apparatus 200B, and the third imaging apparatus 200C turn automatic calibration on, respectively. If the automatic calibration is turned on, generation of a chart image by the imaging apparatus 200, calculation of a color conversion coefficient by the information processing apparatus 100, and setting of the color conversion coefficient in the imaging apparatus 200 are automatically performed. Note that each of the first imaging apparatus 200A in the master mode and the second imaging apparatus 200B and the third imaging apparatus 200C in the slave mode needs to send a notification for notifying the information processing apparatus 100 that the automatic calibration of itself is turned on to the information processing apparatus 100. However, in a case where sending the chart image to the information processing apparatus 100 can be an alternative, it is not necessary to send the notification.

Next, as described in step S115, if the first imaging apparatus 200A detects a chart, the first imaging apparatus 200A captures an image of the chart to generate a chart image, and sends the chart image to the information processing apparatus 100 in step S116. Then, in step S117, the information processing apparatus 100 receives the chart image sent from the first imaging apparatus 200A.

If the information processing apparatus receives a chart image from any one of the imaging apparatuses 200, the information processing apparatus 100 sends an image-capturing operation disable instruction to the first imaging apparatus 200A, the second imaging apparatus 200B, and the third imaging apparatus 200C as described in steps S118, S119, and S120.

Note that, in FIG. 7, if the information processing apparatus 100 receives the chart image from the first imaging apparatus 200A in the master mode, the information processing apparatus 100 sends the image-capturing operation disable instruction to all the imaging apparatuses 200, which is only an example for convenience of description. If the information processing apparatus 100 receives a chart image from any one of the imaging apparatuses 200 regardless of whether the imaging apparatus 200 is in the master mode or the slave mode, the information processing apparatus 100 sends the image-capturing operation disable instruction to all the imaging apparatuses 200.

As described above, the information processing apparatus 100 does not send the image-capturing operation disable instruction at the stage in which reception of the chart images from all the imaging apparatuses 200 is completed, but sends the image-capturing operation disable instruction to all the imaging apparatuses 200 if the information processing apparatus 100 receives a chart image from any one of the imaging apparatuses 200. This is because calibration is started at a stage in which a chart image is received from any one of the imaging apparatuses 200, and image-capturing operation from the user should not be received until the color conversion coefficients are set for color gamut conversion in all the slave imaging apparatuses 200. This is because, if the image-capturing operation is received, an image is captured in a state where the color conversion coefficient is not set and color matching is not performed. Note that the image-capturing operation disabled state invalidates image-capturing operation from the user. Therefore, if the imaging apparatus 200 detects a chart, the imaging apparatus 200 can capture an image of the chart and generate a chart image.

Then, as described in step S121, the first imaging apparatus 200A sets itself to the image-capturing operation disabled state. Furthermore, as described in step S122, the second imaging apparatus 200B also sets itself to the image-capturing operation disabled state. Moreover, as described in step S123, the third imaging apparatus 200C also sets itself to the image-capturing operation disabled state. The image-capturing operation disabled state is a state where an image is not captured even if there is operation to instruct image capturing such as input to the release button from the user. Each of the first imaging apparatus 200A in the master mode and the second imaging apparatus 200B and the third imaging apparatus 200C in the slave mode needs to send a notification for notifying the information processing apparatus 100 that the imaging apparatus itself is in the image-capturing operation disabled state.

As described in step S124, if the second imaging apparatus 200B detects a chart, the second imaging apparatus 200B captures an image of the chart to generate a chart image, and sends the chart image to the information processing apparatus 100 in step S125. Then, in step S126, the information processing apparatus 100 receives the chart image sent from the second imaging apparatus 200B.

Furthermore, as described in step S127, if the third imaging apparatus 200C detects a chart, the third imaging apparatus 200C captures an image of the chart to generate a chart image, and sends the chart image to the information processing apparatus 100 in step S128. Then, in step S129, the information processing apparatus 100 receives the chart image sent from the third imaging apparatus 200C.

Note that, in FIG. 8, each of the second imaging apparatus 200B and the third imaging apparatus 200C generates a chart image after being in the image-capturing operation disabled state, and sends the chart image to the information processing apparatus 100; however, the processing is not necessarily performed in this order. This is because FIG. 7 illustrates an example in which the information processing apparatus 100 sends the image-capturing operation disable instruction to all the imaging apparatuses 200 upon receiving the chart image sent from the first imaging apparatus 200A. Therefore, in a case where the second imaging apparatus 200B first sends the chart image to the information processing apparatus 100, the second imaging apparatus 200B is in the image-capturing operation disabled state thereafter. Furthermore, in a case where the third imaging apparatus 200C first sends the chart image to the information processing apparatus 100, the third imaging apparatus 200C is in the image-capturing operation disabled state thereafter.

If the information processing apparatus 100 receives the chart images from all the imaging apparatuses 200, the information processing apparatus 100 then calculates color conversion coefficients as described in step S130. Note that if the information processing apparatus 100 receives at least the chart image from the master imaging apparatus 200 and the chart image from one slave imaging apparatus 200, the information processing apparatus 100 may calculate the color conversion coefficient for the one slave imaging apparatus 200. In this case, each time a chart image is received from another slave imaging apparatus 200, a color conversion coefficient for the other slave imaging apparatus 200 is calculated.

Here, calculation of the color conversion coefficient will be described. Since the chart image also includes a noise component and the like, first, an average value of pixels is obtained for each patch constituting the chart and is used as a representative value of the patch. For example, the color of the white patch is calculated as (R, G, B)=(240, 240, 240).

With the chart image of the first imaging apparatus 200A in the master mode as a reference, the information processing apparatus 100 calculates a color conversion coefficient optimized for the second imaging apparatus 200B such that colors of the chart image of the second imaging apparatus 200B in the slave mode match colors of the chart image of the first imaging apparatus 200A. Furthermore, with the chart image of the first imaging apparatus 200A in the master mode as a reference, the information processing apparatus 100 calculates a color conversion coefficient optimized for the third imaging apparatus 200C such that colors of the chart image of the third imaging apparatus 200C in the slave mode match colors of the chart image of the first imaging apparatus 200A. That is, the information processing apparatus 100 calculates the color conversion coefficient for each slave imaging apparatus 200 with the chart image of the first imaging apparatus 200A in the master mode as a reference.

The matrix coefficient as the color conversion coefficient is calculated, for example, by using the least squares method so that the difference for each color of the patches constituting the chart is minimized.

Figure 9:
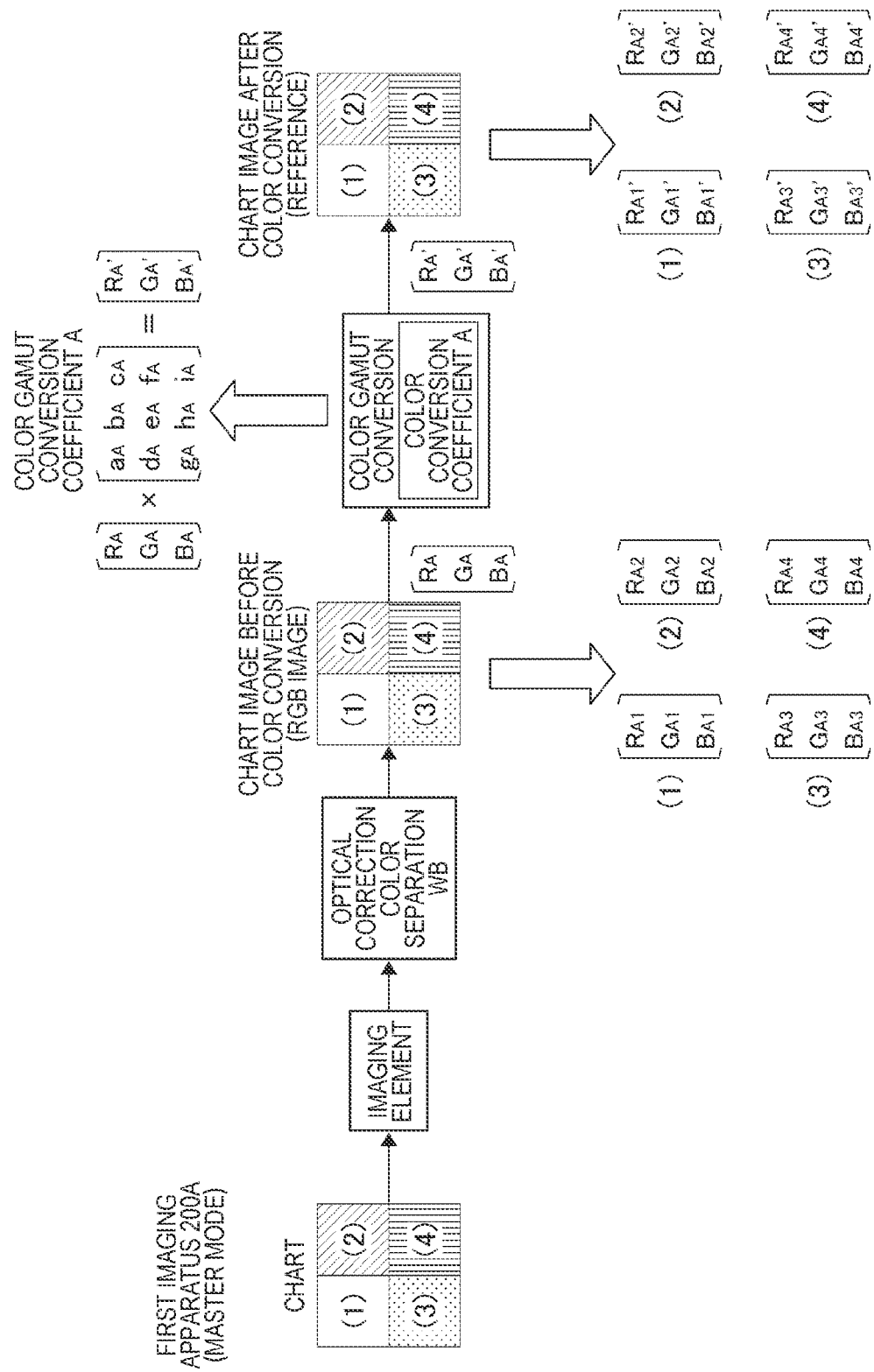
FIG. 9 is an explanatory diagram of color conversion coefficient calculation.
Figure 10:
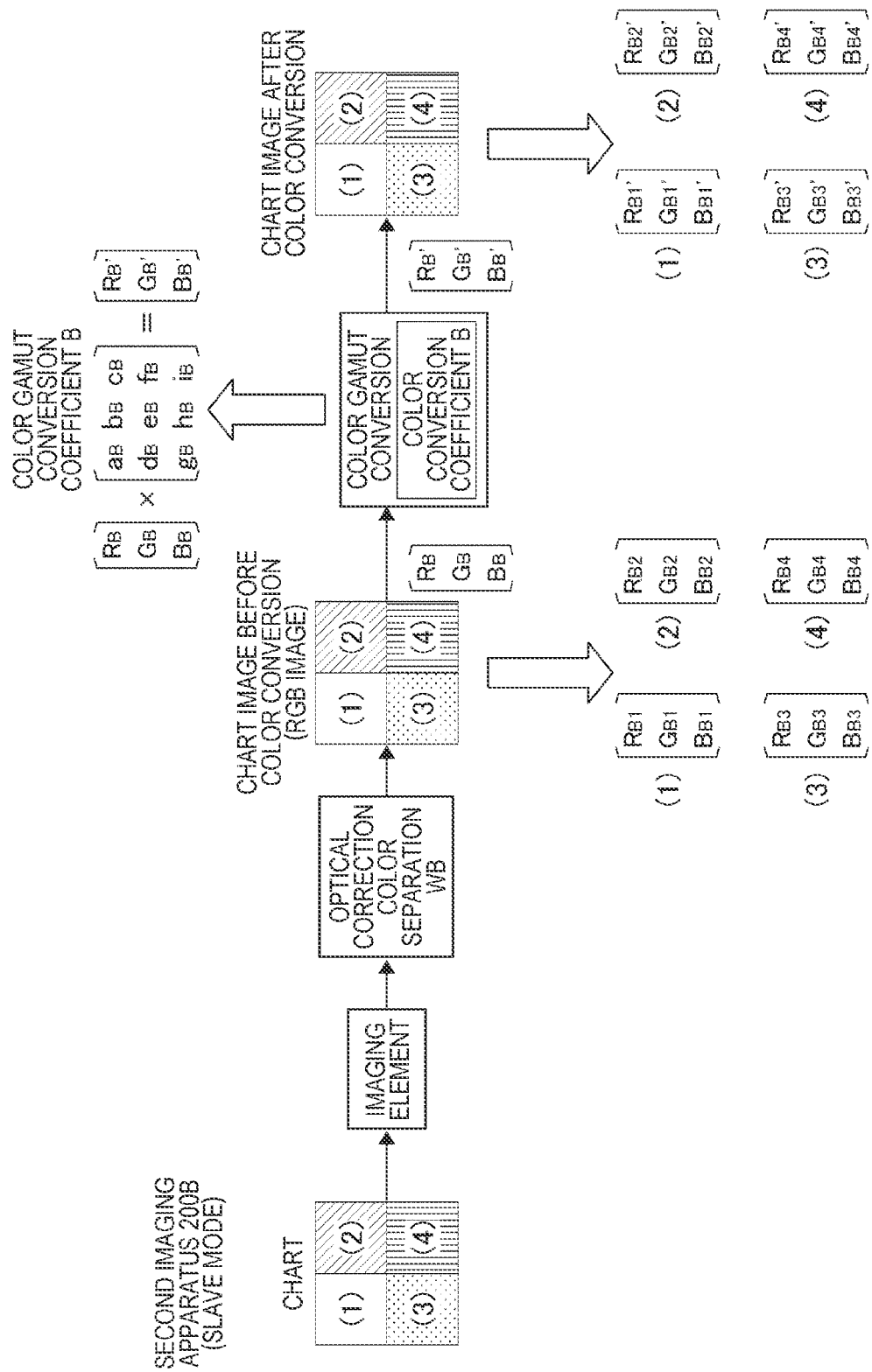
FIG. 10 is an explanatory diagram of color conversion coefficient calculation.

FIGS. 9 and 10 are explanatory diagrams of color conversion coefficient calculation. Here, calculation of the color conversion coefficient for the second imaging apparatus 200B, which is a slave will be described. In FIGS. 9 and 10, for convenience of description, four patches ((1), (2), (3), (4),) among the plurality of patches constituting the chart are extracted and illustrated.

As illustrated in FIG. 9, if the master first imaging apparatus 200A captures an image of the chart, the master first imaging apparatus 200A performs predetermined image processing such as color separation processing to generate an RGB chart image, and the color gamut conversion unit 204 performs color gamut conversion on the chart image by using a color conversion coefficient. The color conversion coefficient in the master first imaging apparatus 200A is defined as a color conversion coefficient A.

The chart image before color conversion of the master first imaging apparatus 200A is defined by a 1×3 determinant as expressed in the following Formula 1 using three variables (R, G, B).

[Formula 1]

$$\begin{bmatrix} R_A \\ G_A \\ B_A \end{bmatrix}$$

Furthermore, the chart image after color conversion of the master first imaging apparatus 200A is defined by a 1×3 determinant as expressed in the following Formula 2 using three variables (R, G, B).

[Formula 2]

$$\begin{bmatrix} R'_A \\ G'_A \\ B'_A \end{bmatrix}$$

As illustrated in FIG. 10, similarly, if the slave second imaging apparatus 200B captures an image of the chart, the slave second imaging apparatus 200B performs predetermined image processing such as color separation processing to generate an RGB chart image, and the color gamut conversion unit 204 performs color gamut conversion on the chart image by using a color conversion coefficient. The color conversion coefficient in the slave second imaging apparatus 200B is defined as a color conversion coefficient B.

The chart image before color conversion of the slave second imaging apparatus 200B is defined by a 1×3 determinant as expressed in the following Formula 3 using three variables (R, G, B).

[Formula 3]

$$\begin{bmatrix} R_B \\ G_B \\ B_B \end{bmatrix}$$

Furthermore, the chart image before color conversion of the slave second imaging apparatus 200B is defined by a 1×3 determinant as expressed in the following Formula 4 using three variables (R, G, B).

[Formula 4]

$$\begin{bmatrix} R'_B \\ G'_B \\ B'_B \end{bmatrix}$$

In the present embodiment, the color conversion coefficient is a 3×3 determinant as a matrix coefficient. The color conversion coefficient is defined as the following Formula 5 from three variables (a, b, c) for R calculation, three variables (d, e, f) for B calculation, and three variables (g, h, i) for G calculation for the three variables (R, G, B).

[Formula 5]

$$\begin{bmatrix} a & b & c \\ d & e & f \\ g & h & i \end{bmatrix}$$

Furthermore, the color conversion coefficient A for the master first imaging apparatus 200A is defined as the following Formula 6 from the color conversion coefficient of Formula 5.

[Formula 6]

$$\begin{bmatrix} a_A & b_A & c_A \\ d_A & e_A & f_A \\ g_A & h_A & i_A \end{bmatrix}$$

Moreover, the color conversion coefficient B for the slave second imaging apparatus 200B is defined as the following Formula 7 from the color conversion coefficient of Formula 5.

[Formula 7]

$$\begin{bmatrix} a_B & b_B & c_B \\ d_B & e_B & f_B \\ g_B & h_B & i_B \end{bmatrix}$$

The colors of the patches (1), (2), (3), and (4) of the chart image after color conversion in the master first imaging apparatus 200A are expressed by Formulas 8-1, 8-2, 8-3, and 8-4 in the following Formula 8 using the chart image before color conversion and the color conversion coefficient A.

[Formula 8]

$$(1) \begin{bmatrix} R'_{A1} \\ G'_{A1} \\ B'_{A1} \end{bmatrix} = \begin{bmatrix} a_A & b_A & c_A \\ d_A & e_A & f_A \\ g_A & h_A & i_A \end{bmatrix} \times \begin{bmatrix} R_{A1} \\ G_{A1} \\ B_{A1} \end{bmatrix} \quad \text{Formula 8-1}$$

$$(2) \begin{bmatrix} R'_{A2} \\ G'_{A2} \\ B'_{A2} \end{bmatrix} = \begin{bmatrix} a_A & b_A & c_A \\ d_A & e_A & f_A \\ g_A & h_A & i_A \end{bmatrix} \times \begin{bmatrix} R_{A2} \\ G_{A2} \\ B_{A2} \end{bmatrix} \quad \text{Formula 8-2}$$

$$(3) \begin{bmatrix} R'_{A3} \\ G'_{A3} \\ B'_{A3} \end{bmatrix} = \begin{bmatrix} a_A & b_A & c_A \\ d_A & e_A & f_A \\ g_A & h_A & i_A \end{bmatrix} \times \begin{bmatrix} R_{A3} \\ G_{A3} \\ B_{A3} \end{bmatrix} \quad \text{Formula 8-3}$$

$$(4) \begin{bmatrix} R'_{A4} \\ G'_{A4} \\ B'_{A4} \end{bmatrix} = \begin{bmatrix} a_A & b_A & c_A \\ d_A & e_A & f_A \\ g_A & h_A & i_A \end{bmatrix} \times \begin{bmatrix} R_{A4} \\ G_{A4} \\ B_{A4} \end{bmatrix} \quad \text{Formula 8-4}$$

Furthermore, the colors of the patches (1), (2), (3), and (4) of the chart image after color conversion in the slave second imaging apparatus 200B are expressed by Formulas 9-1, 9-2, 9-3, and 9-4 in the following Formula 9 using the chart image before color conversion and the color conversion coefficient B.

[Formula 9]

(1) $\begin{bmatrix} R'_{B1} \\ G'_{B1} \\ B'_{B1} \end{bmatrix} = \begin{bmatrix} a_B & b_B & c_B \\ d_B & e_B & f_B \\ g_B & h_B & i_B \end{bmatrix} \times \begin{bmatrix} R_{B1} \\ G_{B1} \\ B_{B1} \end{bmatrix}$  Formula 9-1

(2) $\begin{bmatrix} R'_{B2} \\ G'_{B2} \\ B'_{B2} \end{bmatrix} = \begin{bmatrix} a_B & b_B & c_B \\ d_B & e_B & f_B \\ g_B & h_B & i_B \end{bmatrix} \times \begin{bmatrix} R_{B2} \\ G_{B2} \\ B_{B2} \end{bmatrix}$  Formula 9-2

(3) $\begin{bmatrix} R'_{B3} \\ G'_{B3} \\ B'_{B3} \end{bmatrix} = \begin{bmatrix} a_B & b_B & c_B \\ d_B & e_B & f_B \\ g_B & h_B & i_B \end{bmatrix} \times \begin{bmatrix} R_{B3} \\ G_{B3} \\ B_{B3} \end{bmatrix}$  Formula 9-3

(4) $\begin{bmatrix} R'_{B4} \\ G'_{B4} \\ B'_{B4} \end{bmatrix} = \begin{bmatrix} a_B & b_B & c_B \\ d_B & e_B & f_B \\ g_B & h_B & i_B \end{bmatrix} \times \begin{bmatrix} R_{B4} \\ G_{B4} \\ B_{B4} \end{bmatrix}$  Formula 9-4

In a case where the color conversion coefficient B for the slave second imaging apparatus 200B is not appropriately set, the colors in the image after the color conversion processing are different between the master first imaging apparatus 200A and the slave second imaging apparatus 200B. Therefore, the information processing apparatus 100 uses the chart image after the color gamut conversion of the master first imaging apparatus 200A as a reference, and calculates the color conversion coefficient B for the second imaging apparatus 200B so as to match the colors of the chart image after the color gamut conversion of the slave second imaging apparatus 200B to the colors of the reference.

In the calculation of the color conversion coefficient B, a common color conversion coefficient (aB to iB) that minimizes the sum of squares of differences between the colors of the chart image after the color gamut conversion of the first imaging apparatus 200A and the colors of the chart image after the color gamut conversion of the second imaging apparatus 200B is calculated by a least squares method using Formulas 8 and 9. More specifically, for the three variables (R, G, B), three variables (a, b, c) for R calculation, three variables (d, e, f) for B calculation, and three variables (g, h, i) for G calculation are calculated by the multivariable least squares method.

A calculation formula of the multivariable least squares method is expressed in FIG. 11. For example, the three variables (a, b, c) for R calculation of the color conversion coefficient B can be calculated by the multivariable least squares method by defining necessary variables as follows.

x=(RB, GB, BB) . . . n (3 variables)

xl: x1 to x4 (Data before color conversion of four colors of patches (1), (2), (3), and (4))

yl: RA1' to RA4'

(Data of Four Colors of Chart Image of Master Imaging Apparatus 200 (Reference))

am: a1=a, a2=b, a3=c, . . . m=3 (number of coefficients to be obtained)

gm: g1 to g3

RB'=$a_B \times R_B + b_B \times B_B + c_B \times G_B$

In this manner, the color conversion coefficient B is calculated. Similarly, the color conversion coefficient for the third imaging apparatus 200C can be calculated on the basis of the chart image of the first imaging apparatus 200A. Note that since the above-described variables other than am are known, am=coefficient is obtained by matrix operation.

As described above, the color conversion coefficient may be not only a matrix coefficient but also a 3D LUT or the like. In a case where the color conversion coefficient is calculated as a 3D LUT, the 3D LUT table data is calculated for each slave imaging apparatus 200 so that the difference in color from the master imaging apparatus 200 is minimized.

The description returns to FIG. 8. If the information processing apparatus 100 calculates the color conversion coefficient, the information processing apparatus 100 sends the color conversion coefficient to the slave second imaging apparatus 200B in step S131, and sends the color conversion coefficient to the slave third imaging apparatus 200C in step S132. The color conversion coefficient is optimized and calculated for each imaging apparatus 200, and the color conversion coefficient sent to the second imaging apparatus 200B differs from the color conversion coefficient sent to the third imaging apparatus 200C.

If the second imaging apparatus 200B receives the color conversion coefficient, the second imaging apparatus 200B sets the color conversion coefficient for color gamut conversion in the color gamut conversion unit 204 as described in step S133. If setting of the color conversion coefficients is completed, the second imaging apparatus 200B sends a setting completion notification to the information processing apparatus 100 in step S134.

Furthermore, if the third imaging apparatus 200C receives the color conversion coefficient, the third imaging apparatus 200C sets the color conversion coefficient for color gamut conversion in the color gamut conversion unit 204 as illustrated in step S135. If setting of the color conversion coefficient is completed, the third imaging apparatus 200C sends a setting completion notification to the information processing apparatus 100 in step S136.

As described in step S137, if the information processing apparatus 100 receives the setting completion notification from the second imaging apparatus 200B and the third imaging apparatus 200C, the information processing apparatus 100 sends an instruction to enable image-capturing operation to the first imaging apparatus 200A, the second imaging apparatus 200B, and the third imaging apparatus 200C in steps S138, S139, and S140.

Then, in step S141, the first imaging apparatus 200A sets itself to the image-capturing operation enabled state. In step S142, the second imaging apparatus 200B sets itself to the image-capturing operation enabled state. In step S143, the third imaging apparatus 200C sets itself to the image-capturing operation enabled state. As a result, the second imaging apparatus 200B and the third imaging apparatus 200C can capture images in a state where the colors are matched to the colors in the first imaging apparatus 200A.

Note that the imaging apparatus 200 may set itself to the image-capturing operation enabled state at a stage in which setting of the color conversion coefficient is completed without requiring an instruction to enable the image-capturing operation from the information processing apparatus 100. However, in a case where it is desired to simultaneously start capturing images by the plurality of imaging apparatuses 200, all the imaging apparatuses 200 need to mutually know that all the imaging apparatus 200 have finished setting of the color conversion coefficients. This is because even if setting of the color conversion coefficient is completed in any one of the imaging apparatuses 200, there is a possibility that setting of the color conversion coefficient is not completed in other imaging apparatuses 200 yet. Therefore, in such a case, each imaging apparatus 200 notifies the other imaging apparatuses 200 that setting of the color conversion coefficient has been completed, and starts capturing an image after confirming setting completion of the color conversion coefficients in all the imaging apparatuses 200.

Then, in step S144, the information processing apparatus 100 is in a standby state. The standby state is a state where the next calibration is not performed for a predetermined time so that the next calibration does not start unintentionally. For example, if the predetermined time is set to one hour, the next calibration does not automatically start until one hour elapses after the end of calibration.

If the set time has elapsed, the information processing apparatus 100 instructs the imaging apparatus 200 to perform chart detection again. If at least one imaging apparatus 200 detects a chart and sends a chart image to the information processing apparatus 100, the information processing system 10 transitions to calibration, and thus, the image-capturing operation disabled state is set again.

Note that, in the imaging apparatus 200, it is not preferable that colors are changed by setting a different color conversion coefficient during image capturing. Therefore, in order to prevent this, it is preferable not to receive any notification, instruction, information, and the like from the information processing apparatus 100 during image capturing.

In this manner, processing in the information processing system 10 is performed.

Figure 12:
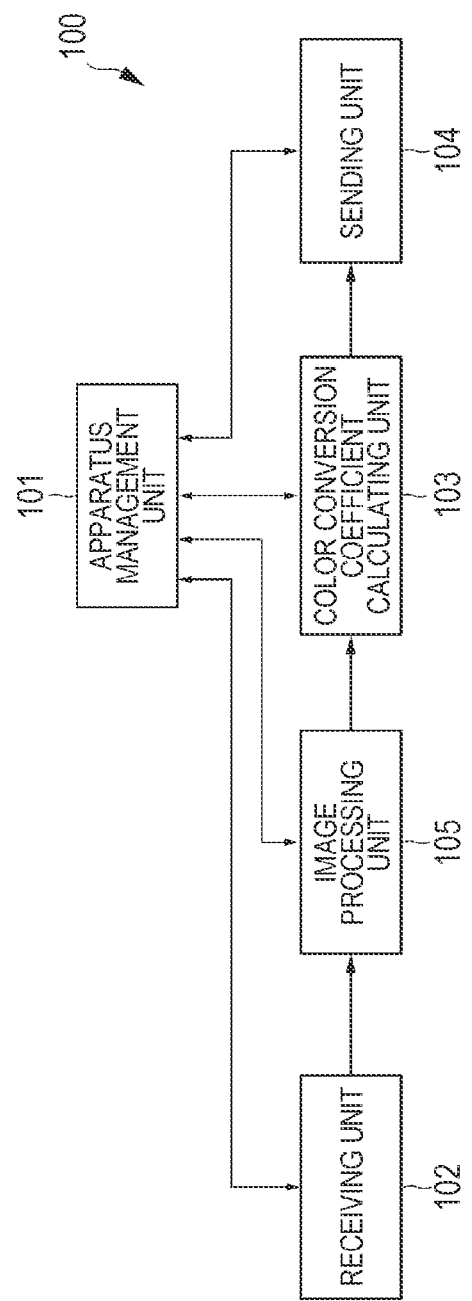
FIG. 12 is a diagram illustrating another configuration example of the information processing apparatus 100.

Note that, as illustrated in FIG. 12, the information processing apparatus 100 may be provided with an image processing unit 105 that performs various types of image processing on the chart image before calculating the color conversion coefficient.

Figure 13:
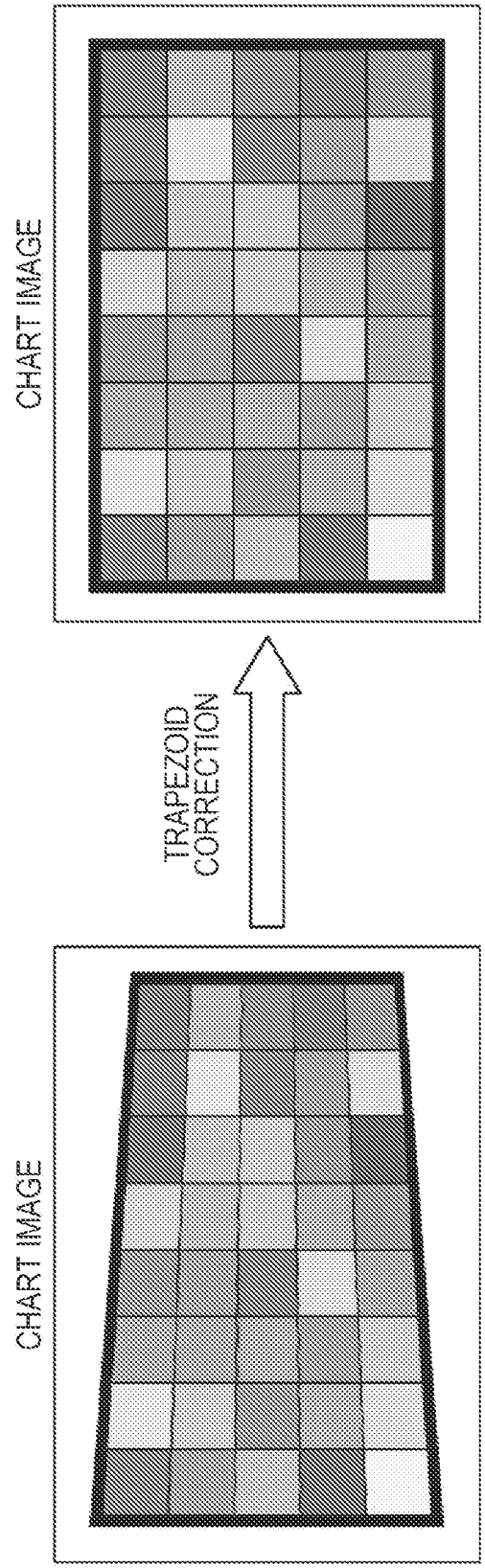
FIG. 13 is an explanatory diagram of trapezoid correction.

The information processing apparatus 100 uses the chart image captured by each imaging apparatus 200 to calculate the color conversion coefficient; however, the chart in the chart image is not rectangular but is trapezoidal as illustrated in FIG. 13 in some cases depending on the angle of the imaging apparatus 200 or the like. In this state, colors cannot be accurately compared, and a color conversion coefficient cannot be calculated from a difference in color. Therefore, the image processing unit 105 performs trapezoid correction on the chart image to convert the chart into a rectangle. As a result, the chart image of the master imaging apparatus 200 and the chart image of the slave imaging apparatus 200 can be accurately compared to calculate the color conversion coefficient from the difference in color.

Figure 14:
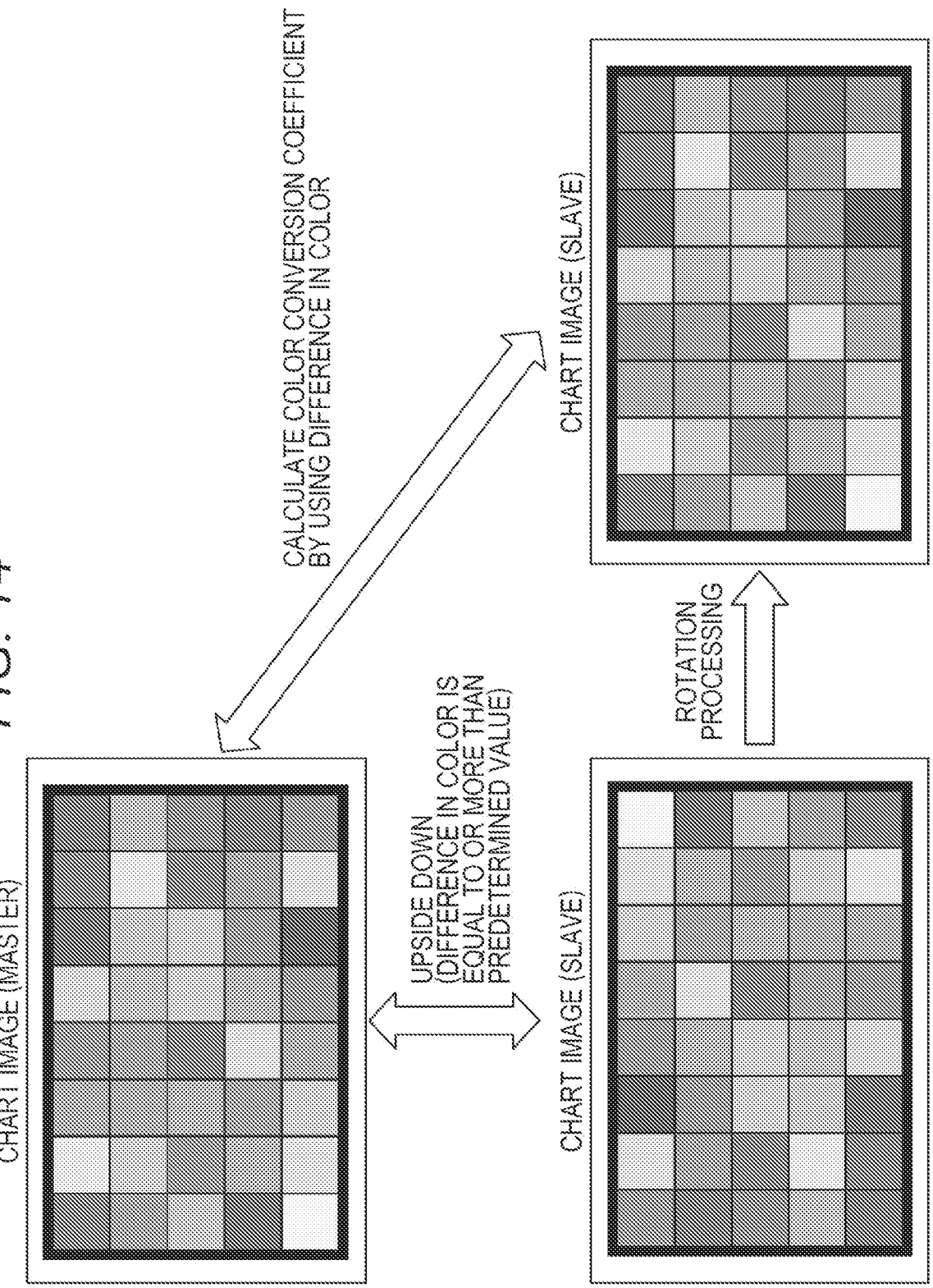
FIG. 14 is an explanatory diagram of rotation processing.

Furthermore, a case is considered in which, when the information processing apparatus 100 receives the chart images from the master imaging apparatus 200 and the slave imaging apparatus 200, the difference in color for each patch between the master chart image and the slave chart image is a predetermined value or more as illustrated in FIG. 14. The difference in color being equal to or more than a predetermined value means, for example, that ΔE (one of color difference indices) is equal to or more than 10.

In this case, it is determined that the chart in the slave chart image is rotated by 180 degrees with respect to the chart in the master chart image because the user erroneously captured an image of the chart in the upside down state, and the image processing unit 105 performs 180-degree rotation processing for correcting the orientation of the slave image. Then, the color conversion coefficient is calculated in a case where the difference in color for each patch between the master chart image and the slave chart image subjected to the rotation processing is equal to or less than a predetermined value.

Note that, since there is a case where a chart image in a state where the chart is rotated by 90 degrees is captured, such as a case where the chart is square, the image processing unit 105 may perform 90-degree rotation processing, and the rotation angle is not limited to 180 degrees.

[1-5. User Interface]

A user interface for using the information processing system 10 will be described. This user interface is displayed on an apparatus on which the information processing apparatus 100 operates.

Figure 15:
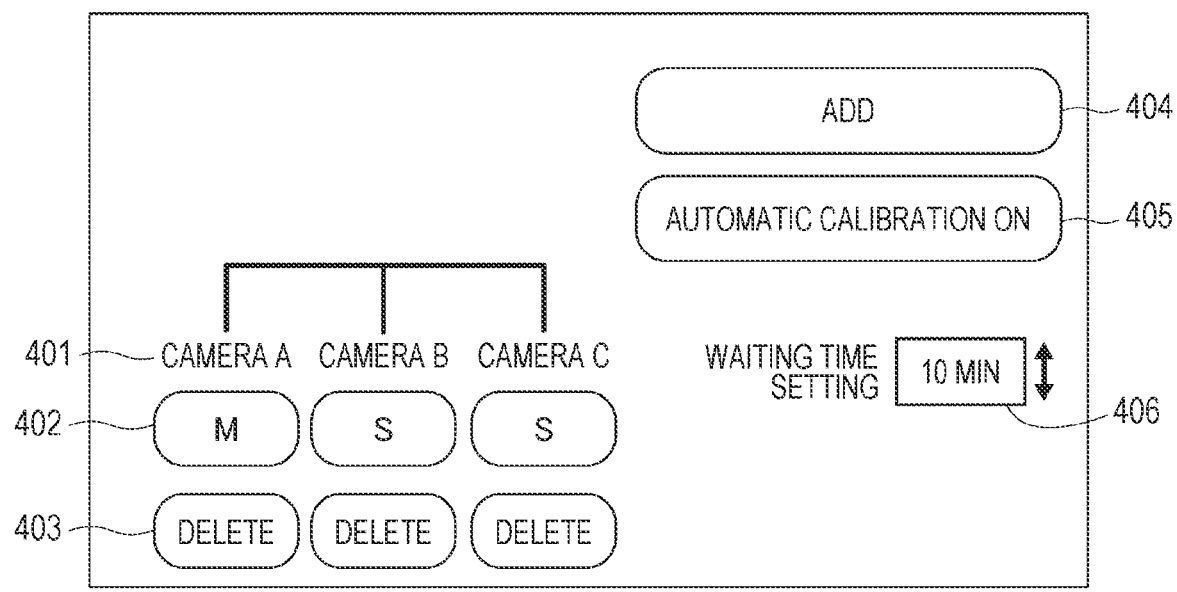
FIG. 15 is a diagram illustrating an example of a UI for the information processing system 10.

The user interface illustrated in FIG. 15 is provided with an imaging apparatus display 401, a master/slave switching button 402, a delete button 403, an add button 404, an automatic calibration setting button 405, and a waiting time setting button 406.

The imaging apparatus display 401 constitutes the information processing system 10 and displays the names or the like of the imaging apparatuses 200 connected/registered to the information processing apparatus 100.

The master/slave switching button 402 is used by the user to switch whether to operate the imaging apparatus 200 in the master mode or the slave mode.

Since only one of the plurality of imaging apparatuses 200 operates in the master mode, if an input to set any one of the imaging apparatus 200 to the master mode is performed, the other imaging apparatuses 200 are automatically set to the slave mode. For example, the master/slave switching button 402 corresponding to the master imaging apparatus 200 is displayed as M, and the master/slave switching button 402 corresponding to the slave imaging apparatus 200 is displayed as S. Therefore, the user can visually confirm whether the mode is the master mode or the slave mode.

An input is made to the delete button 403 when an arbitrary imaging apparatus 200 is excluded from the information processing system 10. If the user makes an input to the delete button 403, communication connection between the imaging apparatus 200 corresponding to the delete button 403 and the information processing apparatus 100 is cut off, and the imaging apparatus 200 does not constitute the information processing system 10.

An input is made to the add button 404 when a new imaging apparatus 200 is added to the information processing system 10 and is registered to the information processing apparatus 100. For example, in a case where the imaging apparatus 200 has a function of displaying device-specific identification information (a QR code (registered trademark) or the like) on the display unit 207, the user operates the imaging apparatus 200 to display the identification information. Then, if the user reads the identification information by using the camera function (which may be included in the information processing apparatus 100 or in an external camera apparatus) and makes an input to the add button 404, the information processing apparatus 100 can obtain the identification information and the unique network information of the new imaging apparatus 200. Then, the information processing apparatus 100 and the imaging apparatus 200 are connected, and moreover, the apparatus management unit 101 discriminates the identification information of the new imaging apparatus 200 and registers the imaging apparatus 200 under the control of the control unit 150 of the information processing apparatus 100. Note that, in addition to capturing an image of identification information such as a QR code (registered trademark), a method of inputting an ID unique to the imaging apparatus 200 to the information processing apparatus 100, searching for an apparatus connected to a common network, detecting an apparatus having a wireless network connection function such as Bluetooth (registered trademark), or the like may be used.

The user can switch on/off of the automatic calibration by making an input to the automatic calibration setting button 405. In a case where the automatic calibration is turned on, the automatic calibration can be turned off at any time, and if there is an input to turn off from the user, the information processing apparatus 100 forcibly stops the calibration even during calibration operation. In this case, the latest color conversion coefficient most recently set remains set in the imaging apparatus 200.

In the information processing system 10, it is also possible that calibration cannot be executed again unless a predetermined time elapses after calibration is executed. This can be realized by measuring time using a clocking function normally included in the information processing apparatus 100 and the imaging apparatus 200, and not capturing an image and not generating a chart image even if a chart is detected before a predetermined time elapses after execution of calibration.

The waiting time setting button 406 is used to set a time until calibration can be executed again after calibration is executed. In a case where it is not desired to change the setting of the color conversion coefficient in the color gamut conversion unit 204, it is possible to prevent unnecessary calibration from being executed by setting an appropriate time.

Figure 16:
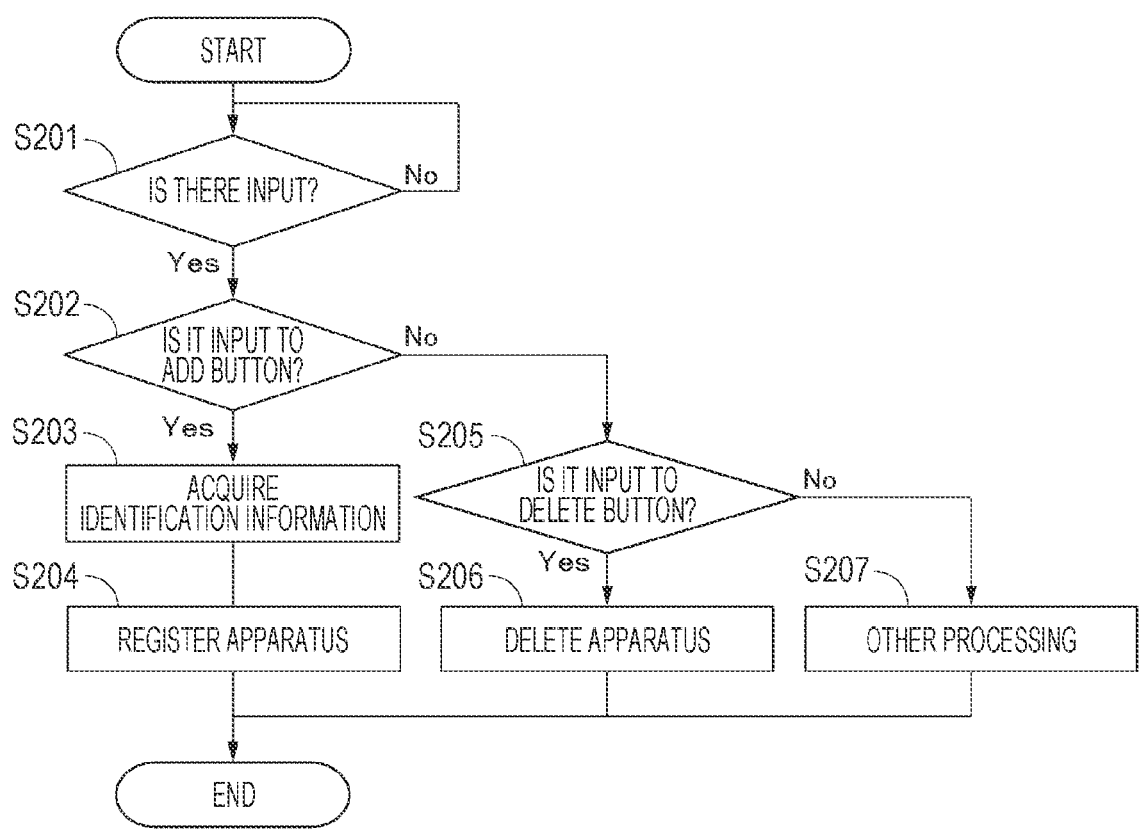
FIG. 16 is a flowchart illustrating additional processing of the imaging apparatus 200.

Here, registration and deletion processing of the imaging apparatus 200 performed by the information processing apparatus 100 will be described with reference to the flowchart of FIG. 16.

First, in step S201, it is determined whether or not there is an input from the user, and in a case where there is an input, the processing proceeds to step S202 (Yes in step S201). Next, in step S202, in a case where the input from the user is an input to the add button 404, the processing proceeds to step S203 (Yes in step S202). Next, in step S203, the apparatus management unit 101 acquires identification information of the imaging apparatus 200. As described above, the identification information can be acquired by recognition of a QR code (registered trademark) or the like. Then, in step S204, the imaging apparatus 200 corresponding to the identification information is registered as an apparatus constituting the information processing system 10.

In contrast, in step S202, in a case where the input from the user is not an input to the add button 404, the processing proceeds to step S205 (No in step S202). Next, in step S205, in a case where the input from the user is an input to the delete button 403, the processing proceeds to step S206 (Yes in step S205). Then, in step S206, the network connection with the imaging apparatus 200 corresponding to the delete button 403 to which the input is made is cut off and the imaging apparatus 200 is deleted from the information processing system 10.

In step S205, in a case where the input from the user is not the input to the delete button 403, the processing proceeds to step S207, and the information processing apparatus 100 performs processing according to the input from the user other than addition and deletion of the apparatus.

FIG. 17 is an example of the user interface by illumination of a tally lamp 220 or the like normally included in the imaging apparatus 200. The state of calibration can be visually indicated by using the tally lamp 220 or the like. For example, as illustrated in FIG. 17A, illumination in a specific color (for example, green) indicates that calibration has been completed, blinking in the specific color indicates that calibration is being performed, and illumination in a color (for example, red) other than the specific color indicates that some abnormal state has occurred. Note that the above-described illumination/blinking method is merely an example, and the illumination/blinking method is not limited thereto. Furthermore, what is illuminated is not limited to the tally lamp 220, and any light may be used as long as the light is included in the imaging apparatus 200 and can be easily visually recognized by the user.

The processing according to the present technology is performed as described above. According to the present technology, the information processing apparatus 100 calculates an optimized color conversion coefficient for each imaging apparatus 200, and each imaging apparatus 200 performs color gamut conversion on the basis of the color conversion coefficient. Therefore, the user can capture images with a plurality of imaging apparatuses 200 in a state where colors are matched.

A common standard color gamut (independent of look) is defined in each imaging apparatus 200, the colors in the slave imaging apparatus 200 are matched to the colors in the master imaging apparatus 200, and thereafter, color matching by an arbitrary look can be performed among the plurality of imaging apparatus 200 by common look processing. Therefore, color matching and the look processing can be performed separately.

Furthermore, calibration can be performed only by holding a chart over the plurality of imaging apparatuses 200 used for capturing images. When an image is not captured, if all the imaging apparatuses 200 used for capturing images are always in a state where a chart can be detected, calibration can be automatically performed as soon as the chart is detected.

The number of colors of the chart may be arbitrary (recognized in a rectangular shape), and the accuracy of color matching becomes higher as the number of colors of the chart is larger. In a case where an image-capturing condition changes such as a case where lighting is changed in capturing an image or a case where weather changes, if calibration is performed again, images can be captured with the plurality of imaging apparatus 200 in which colors are matched even under the new image-capturing condition. Since color matching is optimized only for the current image-capturing condition, the color matching processing is completed in a short time and images can be captured.

Moreover, since image-capturing operation is not enabled until calibration of all the imaging apparatuses 200 used for capturing images is completed, it is possible to prevent images from being captured in a state where colors are not matched. Furthermore, it is also possible to prevent calibration from being executed while images are captured by automatically turning off detection of a chart while images are captured.

2. Modifications

Although embodiments of the present technology have been specifically described above, the present technology is not limited to the above-described embodiments, and various modifications based on the technical idea of the present technology are possible.

In the embodiments, the processing target is image data; however, the processing target may be video data.

In the embodiments, the information processing apparatus 100 has been described as an apparatus separate from the imaging apparatus 200; however, any of the plurality of imaging apparatuses 200 may function as the information processing apparatus 100.

In a case where the information processing apparatus 100 operates on the master imaging apparatus 200, the information processing apparatus 100 receives a chart image from the slave imaging apparatus 200, calculates a color conversion coefficient to match the colors to the colors in the imaging apparatus 200 on which the information processing apparatus 100 operates, and sends the color conversion coefficient to the slave imaging apparatus 200. The information processing apparatus 100 does not need to calculate a color conversion coefficient for the imaging apparatus 200 on which the information processing apparatus 100 itself operates.

In contrast, in a case where the information processing apparatus 100 operates on the slave imaging apparatus 200, the information processing apparatus 100 receives a chart image from the master imaging apparatus 200, calculates a color conversion coefficient for the slave imaging apparatus 200 on which the information processing apparatus 100 itself operates. Furthermore, in a case where there is a slave imaging apparatus 200 other than the imaging apparatus 200 on which the information processing apparatus 100 operates, the information processing apparatus 100 also receives a chart image from the imaging apparatus 200, calculates a color conversion coefficient for the imaging apparatus 200, and sends the color conversion coefficient.

Furthermore, all the imaging apparatuses 200 may have the function of the information processing apparatus 100, and each imaging apparatus 200 may calculate a color conversion coefficient for itself. In this case, the master imaging apparatus 200 sends a chart image to all the slave imaging apparatuses 200, and the slave imaging apparatuses 200 receive the chart image and calculate the color conversion coefficients. Since the color conversion coefficient calculated by the slave imaging apparatus 200 is for itself, it is not necessary to send the color conversion coefficient to the other imaging apparatuses 200.

Furthermore, the information processing apparatus 100 may be configured as a cloud system. The cloud is one of use forms of a computer, and is constructed in a server of a cloud service provider. Basically, all necessary processing is performed on the server side. The user stores data in the server on the Internet instead of the user's own apparatus or the like. Therefore, it is possible to use services, use data, edit data, upload data, and the like even in various environments such as a home, a company, a place outside the office, an image-capturing site, and an editing room. Furthermore, in the cloud system, transfer of various data between apparatuses connected via a network, and the like can also be performed.

In a case where the information processing apparatus 100 is configured as a cloud system, each imaging apparatus 200 sends a chart image to the cloud system via a network, receives a color conversion coefficient calculated by the cloud system, and sets the color conversion coefficient for its own color gamut conversion.

In the embodiments, look data is sent from the information processing apparatus 100 to an apparatus such as the imaging apparatus 200, and the apparatus processes image data with the look data. However, processing may be performed on image data by using look data on the cloud system side.

A chart image and a color conversion coefficient may be sent and received between the information processing apparatus 100 and the imaging apparatus 200 not only via wired/wireless communication but also via a storage medium such as a universal serial bus (USB) memory or an SD card.

The present technology can also be configured as follows.

(1)

An information processing system including: an imaging apparatus that operates in a master mode; at least one imaging apparatus that operates in a slave mode; and an information processing apparatus, in which each of the imaging apparatus in the master mode and the imaging apparatus in the slave mode sends a chart image generated by capturing an image of a specific chart to the information processing apparatus, and the information processing apparatus calculates a color conversion coefficient in the imaging apparatus in the slave mode on the basis of the chart image generated by the imaging apparatus in the master mode, and sends the color conversion coefficient to the imaging apparatus corresponding to the color conversion coefficient.

(2)

The information processing system according to (1), in which the information processing apparatus calculates the color conversion coefficient by using a difference in color between the chart image generated by the imaging apparatus in the master mode and the chart image generated by the imaging apparatus in the slave mode.

(3)

The information processing system according to (2), in which the information processing apparatus calculates the color conversion coefficient such that a difference in color between the chart image of the imaging apparatus in the master mode and the chart image of the imaging apparatus in the slave mode is minimized.

(4)

The information processing system according to any one of (1) to (3), in which the color conversion coefficient is a matrix coefficient.

(5)

The information processing system according to any one of (1) to (4), in which the color conversion coefficient is a 3D LUT.

(6)

The information processing system according to any one of (1) to (5), in which the imaging apparatus includes a color gamut conversion unit that performs color gamut conversion on the basis of the color conversion coefficient.

(7)

The information processing system according to (6), in which the imaging apparatus includes a log conversion unit that performs log conversion after the color gamut conversion by the color gamut conversion unit.

(8)

The information processing system according to (6), in which the imaging apparatus includes a look processing unit that performs look processing after the color gamut conversion by the color gamut conversion unit.

(9)

The information processing system according to any one of (1) to (8), in which the imaging apparatus includes a subject detection unit and a control unit, and if a chart detection result indicating that the subject detection unit detects the specific chart is sent to the control unit, the imaging unit captures an image of the specific chart and generates the chart image under control of the control unit.

(10)

The information processing system according to (2), in which the information processing apparatus includes an image processing unit that performs image processing on the chart image, and the image processing unit performs processing of correcting orientation of the chart image in a case where the difference in color is a predetermined value or more.

(11)

The information processing system according to any one of (1) to (10), in which if the information processing apparatus receives the chart image from the imaging apparatus, the information processing apparatus sends an image-capturing operation disable instruction to disable image-capturing operation from a user to all the imaging apparatuses, and the imaging apparatus that has received the image-capturing operation disable instruction sets itself to an image-capturing operation disabled state.

(12)

The information processing system according to (11), in which if the information processing apparatus receives a notification indicating that setting of the color conversion coefficient has been completed from all the imaging apparatuses in the slave mode, the information processing apparatus sends an image-capturing operation enable instruction to enable image-capturing operation to all the imaging apparatuses, and the imaging apparatus that has received the image-capturing operation enable instruction sets itself from the image-capturing operation disabled state to an image-capturing operation enabled state.

(13)

The information processing system according to any one of (1) to (12), in which the information processing apparatus sets any of a plurality of the imaging apparatuses as an imaging apparatus that operates in the master mode.

(14)

The information processing system according to (13), in which the information processing apparatus sends a notification of being in the master mode to the imaging apparatus determined to be in the master mode, and sends a notification of being in the slave mode to an imaging apparatus other than the imaging apparatus determined to be in the master mode.

(15)

An information processing apparatus including a color conversion coefficient calculating unit that calculates a color conversion coefficient in an external imaging apparatus that operates in a slave mode on the basis of a chart image generated by capturing an image of a specific chart by an external imaging apparatus that operates in a master mode.

(16)

An information processing method including calculating a color conversion coefficient in an external imaging apparatus that operates in a slave mode on the basis of a chart image generated by capturing an image of a specific chart by an external imaging apparatus that operates in a master mode.

(17)

An information processing program causing a computer to execute an information processing method including calculating a color conversion coefficient in an external imaging apparatus that operates in a slave mode on the basis of a chart image generated by capturing an image of a specific chart by an external imaging apparatus that operates in a master mode.

(18)

An imaging apparatus that operates in a master mode or a slave mode, sends a chart image generated by capturing an image of a specific chart to an information processing apparatus, and in a case of operating in the slave mode, receives a color conversion coefficient calculated by the information processing apparatus from the information processing apparatus and sets the color conversion coefficient for color gamut conversion.

(19)

A method of controlling an imaging apparatus that operates in a master mode or a slave mode, sends a chart image generated by capturing an image of a specific chart to an information processing apparatus, and in a case of operating in the slave mode, receives a color conversion coefficient calculated by the information processing apparatus from the information processing apparatus and sets the color conversion coefficient for color gamut conversion.

(20)

A control program causing a computer to execute a method of controlling an imaging apparatus that operates in a master mode or a slave mode, sends a chart image generated by capturing an image of a specific chart to an information processing apparatus, and in a case of operating in the slave mode, receives a color conversion coefficient calculated by the information processing apparatus from the information processing apparatus and sets the color conversion coefficient for color gamut conversion.

REFERENCE SIGNS LIST

10 Information processing system
100 Information processing apparatus
103 Color conversion coefficient calculating unit
200 Imaging apparatus
204 Color gamut conversion unit
205 Log conversion unit
206 Look processing unit

The invention claimed is:

1. An information processing system comprising:
  an imaging apparatus configured to operate in a master mode;
  at least one imaging apparatus configured to operate in a slave mode; and
  an information processing apparatus,
  wherein each imaging apparatus of the imaging apparatus in the master mode and the at least one imaging apparatus in the slave mode is further configured to send a chart image generated by capturing an image of a specific chart to the information processing apparatus, and
  wherein the information processing apparatus includes circuitry configured to
    calculate a color conversion coefficient in each imaging apparatus in the slave mode based on the chart image generated by the imaging apparatus in the master mode, send the color conversion coefficient to the imaging apparatus corresponding to the color conversion coefficient, and perform log conversion based on the color conversion coefficient.

2. The information processing system according to claim 1, wherein the circuitry calculates the color conversion coefficient by using a difference in color between the chart image generated by the imaging apparatus in the master mode and the chart image generated by each imaging apparatus among the at least one imaging apparatus in the slave mode.

3. The information processing system according to claim 2, wherein the circuitry calculates the color conversion coefficient such that the difference in color between the chart image of the imaging apparatus in the master mode and the chart image of each imaging apparatus of the at least one imaging apparatus in the slave mode is minimized.

4. The information processing system according to claim 1, wherein the color conversion coefficient includes a matrix coefficient.

5. The information processing system according to claim 1, wherein the color conversion coefficient includes a 3D LUT.

6. The information processing system according to claim 1, wherein the circuitry is further configured to perform color gamut conversion based on the color conversion coefficient.

7. The information processing system according to claim 6, wherein the circuitry performs the log conversion after the color gamut conversion is performed.

8. The information processing system according to claim 6, wherein the circuitry is further configured to perform look processing after the color gamut conversion is performed.

9. The information processing system according to claim 1, wherein the imaging apparatus configured to operate in the master mode includes circuitry configured to
detect the specific chart,
capture, if the circuitry detects the specific chart, an image of the specific chart, and
generate the chart image.

10. The information processing system according to claim 2, wherein the circuitry is further configured to
perform image processing on the chart image, and
perform processing of correcting orientation of the chart image in a case where the difference in color is a predetermined value or more.

11. The information processing system according to claim 1, wherein if the information processing apparatus receives the chart image from the imaging apparatus, the circuitry is further configured to send an image-capturing operation disable instruction to disable image-capturing operation from a user to all the imaging apparatuses, and wherein each imaging apparatus that has received the image-capturing operation disable instruction is further configured to set itself to an image-capturing operation disabled state.

12. The information processing system according to claim 11, wherein if the information processing apparatus receives a notification indicating that setting of the color conversion coefficient has been completed from all the imaging apparatuses in the slave mode, the circuitry is further configured to send an image-capturing operation enable instruction to enable image-capturing operation to all the imaging apparatuses, and wherein each imaging apparatus that has received the image-capturing operation enable instruction is further configured to set itself from the image-capturing operation disabled state to an image-capturing operation enabled state.

13. The information processing system according to claim 1, wherein the circuitry is further configured to set any selected imaging apparatus of a plurality of imaging apparatuses as the imaging apparatus configured to operate in the master mode.

14. The information processing system according to claim 13, wherein the circuitry is further configured to
send a notification of being in the master mode to the imaging apparatus determined to be in the master mode, and
send a notification of being in the slave mode to at least one imaging apparatus other than the imaging apparatus determined to be in the master mode.

15. An information processing apparatus comprising:
circuitry configured to calculate a color conversion coefficient in an external imaging apparatus configured to operate in a slave mode based on a chart image generated by capturing an image of a specific chart by an external imaging apparatus configured to operate in a master mode,
wherein log conversion is performed based on the color conversion coefficient.

16. An information processing method comprising:
calculating a color conversion coefficient in an external imaging apparatus configured to operate in a slave mode based on a chart image generated by capturing an image of a specific chart by an external imaging apparatus configured to operate in a master mode,
wherein log conversion is performed based on the color conversion coefficient.

17. A non-transitory computer-readable storage medium having embodied thereon an information processing program, which when executed by a computer causes the computer to execute an information processing method, the method comprising:
calculating a color conversion coefficient in an external imaging apparatus configured to operate in a slave mode based on a chart image generated by capturing an image of a specific chart by an external imaging apparatus configured to operate in a master mode,
wherein log conversion is performed based on the color conversion coefficient.

18. An imaging apparatus configured to operate in a master mode or a slave mode, the imaging apparatus comprising:

circuitry configured to
- send a chart image generated by capturing an image of a specific chart to an information processing apparatus,
- receive, in a case of operating in the slave mode, receives a color conversion coefficient calculated by the information processing apparatus from the information processing apparatus, and
- set the color conversion coefficient for color gamut conversion, wherein log conversion is performed based on the color conversion coefficient.

19. A method of controlling an imaging apparatus configured to operate in a master mode or a slave mode, the method comprising:
- sending a chart image generated by capturing an image of a specific chart to an information processing apparatus;
- receiving in a case of operating in the slave mode, a color conversion coefficient calculated by the information processing apparatus from the information processing apparatus; and
- setting the color conversion coefficient for color gamut conversion, wherein log conversion is performed based on the color conversion coefficient.

20. A non-transitory computer-readable storage medium having embodied thereon a control program, which when executed by a computer causes the computer to execute a method of controlling an imaging apparatus configured to operate in a master mode or a slave mode, the method comprising:
- sending a chart image generated by capturing an image of a specific chart to an information processing apparatus;
- receiving, in a case of operating in the slave mode, a color conversion coefficient calculated by the information processing apparatus from the information processing apparatus; and
- setting the color conversion coefficient for color gamut conversion, wherein log conversion is performed based on the color conversion coefficient.

* * * * *